(12) United States Patent
Kanazawa et al.

(10) Patent No.: US 9,897,993 B2
(45) Date of Patent: Feb. 20, 2018

(54) CONTROL DEVICE FOR MACHINING APPARATUS, MACHINING APPARATUS, AND CORRECTION METHOD OF MACHINING DATA

(71) Applicants: MITSUBISHI HEAVY INDUSTRIES, LTD., Minato-ku, Tokyo (JP); FLOW JAPAN CORPORATION, Shibuya-ku, Tokyo (JP)

(72) Inventors: Hiroyuki Kanazawa, Tokyo (JP); Yasuo Baba, Tokyo (JP)

(73) Assignees: MITSUBISHI HEAVY INDUSTRIES, LTD., Tokyo (JP); FLOW JAPAN CORPORATION, Tokyo (JP)

( * ) Notice: Subject to any disclaimer, the term of this patent is extended or adjusted under 35 U.S.C. 154(b) by 139 days.

(21) Appl. No.: 14/428,926

(22) PCT Filed: Sep. 24, 2013

(86) PCT No.: PCT/JP2013/075752
§ 371 (c)(1),
(2) Date: Mar. 17, 2015

(87) PCT Pub. No.: WO2014/050829
PCT Pub. Date: Apr. 3, 2014

(65) Prior Publication Data
US 2015/0248125 A1    Sep. 3, 2015

(30) Foreign Application Priority Data

Sep. 25, 2012 (JP) ................................. 2012-211061

(51) Int. Cl.
*G05B 19/19* (2006.01)
*G05B 19/404* (2006.01)

(52) U.S. Cl.
CPC ........... *G05B 19/19* (2013.01); *G05B 19/404* (2013.01); *G05B 2219/45112* (2013.01);
(Continued)

(58) Field of Classification Search
CPC .................. G05B 19/19; G05B 19/404; G05B 2219/14112; G05B 2219/45236;
(Continued)

(56) References Cited

U.S. PATENT DOCUMENTS 5,067,086 A    11/1991   Yamazaki et al.
5,422,820 A    6/1995    Seki et al.
(Continued)

FOREIGN PATENT DOCUMENTS

CN    101253018 A    8/2008
CN    101774121 A    7/2010
(Continued)

OTHER PUBLICATIONS

Machine translation of JP2004-058242, Ichihashi Kaoru, Method for correcting cast deburring position deviation, Feb. 26, 2004, 3 pages.*

(Continued)

*Primary Examiner* — Sean Shechtman
*Assistant Examiner* — Tri T Nguyen
(74) *Attorney, Agent, or Firm* — Kanesaka Berner and Partners LLP

(57) ABSTRACT

A machining apparatus includes a multi-joint arm provided with a machining tool for machining a workpiece. A control device of the machining apparatus includes: a storage section for storing NC data indicating a machining region of a workpiece by the machining apparatus; a distance measurement sensor placed on the arm and for measuring a distance between the workpiece and the machining apparatus for each machining surface of the workpiece; and a correction
(Continued)

section for correcting the NC data for each of the machining surfaces based on a measurement result by the distance measurement sensor. As a result of this, the machining apparatus can perform the correction of machining data in correspondence to deviation of a machining object with higher accuracy.

7 Claims, 20 Drawing Sheets

(52) U.S. Cl.
CPC .............. *G05B 2219/45236* (2013.01); *G05B 2219/49062* (2013.01); *G05B 2219/49094* (2013.01); *G05B 2219/49173* (2013.01); *G05B 2219/50053* (2013.01); *G05B 2219/50056* (2013.01)

(58) Field of Classification Search
CPC ........... G05B 2219/49062; G05B 2219/49094; G05B 2219/49173; G05B 2219/50053; G05B 2219/50056
See application file for complete search history.

(56) References Cited

U.S. PATENT DOCUMENTS

| | | | | |
|---|---|---|---|---|
| 6,070,109 A * | 5/2000 | McGee | ................. | B25J 9/1692 700/254 |
| 8,290,740 B2 * | 10/2012 | Tamai | ................... | G01B 5/008 345/419 |
| 8,712,577 B2 * | 4/2014 | Gu | ...................... | G05B 19/401 409/131 |
| 2005/0143861 A1 * | 6/2005 | Watanabe | .............. | B25J 9/1684 700/264 |
| 2009/0144980 A1 * | 6/2009 | Rangarajan | ............. | B23P 6/007 29/889.1 |
| 2009/0144981 A1 | 6/2009 | Kuehhorn et al. | | |
| 2013/0060369 A1 | 3/2013 | Simard et al. | | |
| 2014/0041183 A1 | 2/2014 | Rangarajan et al. | | |

FOREIGN PATENT DOCUMENTS

| | | |
|---|---|---|
| CN | 201993620 U | 9/2011 |
| EP | 2070641 A2 | 6/2009 |
| JP | 1-178395 A | 7/1989 |
| JP | 4-10003 A | 1/1992 |
| JP | 5-80828 A | 4/1993 |
| JP | 6-301411 A | 10/1994 |
| JP | 7-121214 A | 5/1995 |
| JP | 2000-511827 A | 9/2000 |
| JP | 2004-58242 A | 2/2004 |
| JP | 2008-082748 A | 4/2008 |
| JP | 2009-151770 A | 7/2009 |
| WO | 97-46925 A1 | 12/1997 |
| WO | 2011/140646 A1 | 11/2011 |

OTHER PUBLICATIONS

Office Action in CN Patent Application No. 201380047728.3, dated Jul. 15, 2016.
International Search Report and Written Opinion dated Oct. 29, 2013 in International Application No. PCT/JP2013/075752 filed Sep. 24, 2013.
Extended European Search Report dated Nov. 23, 2015, corresponding to European Patent Application No. 13842858.6.
Decision to Grant a Patent in JP Application 2012-211061, dated Jan. 10, 2017.
Office Action in EP Application No. 13842858.6, dated Apr. 7, 2017.

* cited by examiner

FIG. 18
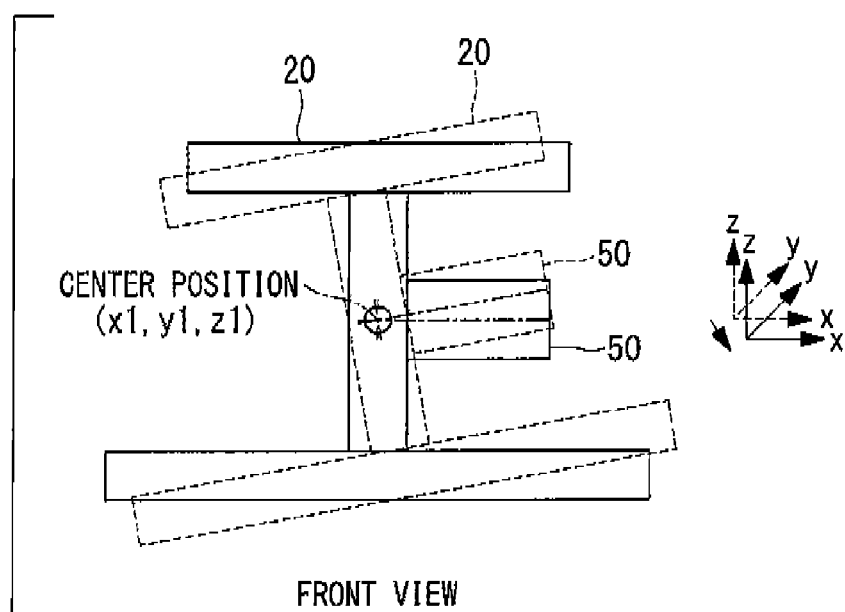
FRONT VIEW
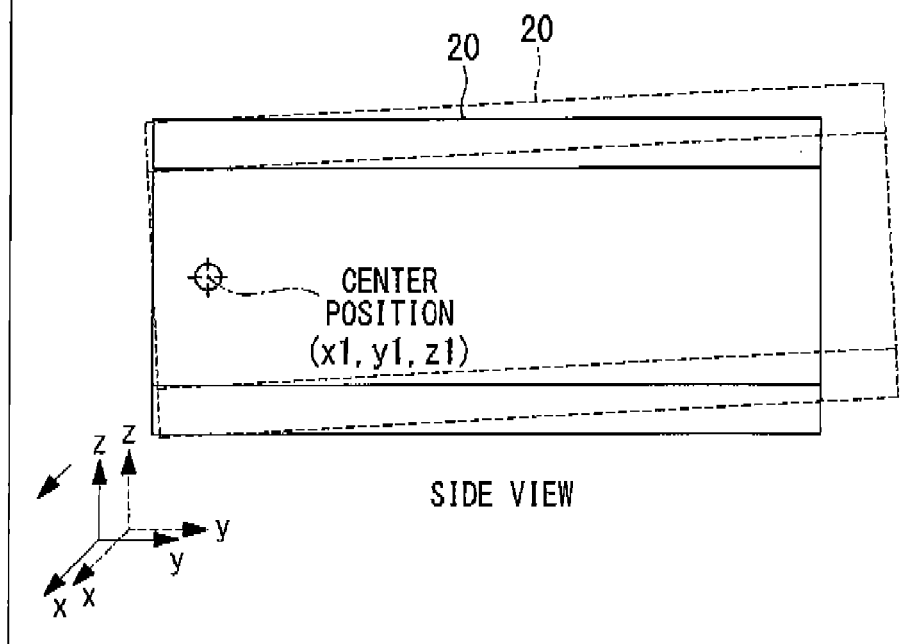
SIDE VIEW

US 9,897,993 B2

CONTROL DEVICE FOR MACHINING APPARATUS, MACHINING APPARATUS, AND CORRECTION METHOD OF MACHINING DATA

RELATED APPLICATIONS

The present application is a National Phase of International Application Number PCT/JP2013/075752, filed Sep. 24, 2013, which claims priority to Japanese Application Number 2012-211061, filed Sep. 25, 2012.

TECHNICAL FIELD

The present invention relates to a control device for a machining apparatus, a machining apparatus, and a correction method of machining data.

BACKGROUND ART

Conventionally, in machine work by use of a machine tool, etc., required machining accuracy is realized by making a jig for deterring deviation of a reference point for each workpiece which is a machining object, and securing the workpiece at a specified position by means of the jig.

For this reason, machining errors tend to increase in the case of a workpiece which cannot be secured by means of the jig in the vicinity of its machining region.

Accordingly, PTL 1 describes a method for moving a machine to a correct position prior to further machine work, in which a position of a retroflector attached to an end effector such as a machine head is measured by using a 3D position sensor such as an interferometric laser tracker when the machine comes to rest, and a computer compares the measured position to a desired position according to machine media, to add appropriate revision to command statements.

CITATION LIST

Patent Literature

{PTL 1}
Japanese Translation of PCT International Application, Publication No. 2000-511827

SUMMARY OF INVENTION

Technical Problem

Conventionally, sensing and correction of machining data (for example, NC data) prior to machining have been practiced to decrease machining error as described in PTL 1. However, in such correction of machining data, a method of shifting entire machining data is generally used.

Here, when the machining object is a large-size or long-size molding, an error (deviation) occurs between machining data generated from CAD data and the shape of a product when the product itself generates distortion after molding, or when a mold for molding (for example, a cast mold) wears and tears. Such error is not an error of positional deviation, but is a state in which a specific area in one product shape has an error in external dimensions (geometry). Moreover, deflection of a machining object which is caused by supporting the machining object in a cantilever fashion may be a cause of error.

If conventional correction is performed on machining data to eliminate errors, the entire machining data may be shifted due to correction in correspondence to a specific portion, and there is possibility that dimensions of the product do not fall within tolerance.

For that reason, in general, it becomes necessary to perform finial finish machining, or the like by modified CAD data, or newly created other machining data, so that dimensions of the product fall within tolerance. A product molded through such method is a product which is machined so as to fall within tolerance by changing its shape, and which is therefore considered to be low quality when the shape itself of the product has significant meaning in the design.

The present invention has been made in view of the above described circumstances, and has its object to provide a control device for a machining apparatus, a machining apparatus, and a correction method of machining data, which can perform the correction of machining data in correspondence to deviation of a machining object with higher accuracy.

Solution to Problem

In order to solve the above described problems, a control device for a machining apparatus, a machining apparatus, and a correction method of machining data of the present invention adopt the following solutions.

A control device for a machining apparatus relating to a first aspect of the present invention is a control device for a machining apparatus including a multi-joint arm provided with a machining tool for machining a machining object, the control device including: a storage section that stores machining data indicating a machining region of the machining object by the machining apparatus; a distance measurement sensor placed on the arm and that measures a distance between the machining object and the machining apparatus for each machining surface of the machining object; and a correction section that corrects the machining data for each of the machining surfaces based on a measurement result by the distance measurement sensor.

According to the present configuration, the machining apparatus includes a multi-joint arm on which a machining tool for machining a machining object is provided. Further, the control device for the machining apparatus includes a storage section for storing machining data indicating a machining region of the machining object by the machining apparatus.

Here, when the machining object is, for example, a large-size or long-size molding, which is secured by a jig, but in a cantilever fashion, there is possibility that the machining region to be machined by the machining apparatus is deflected. Moreover, there are also possibilities that distortion occurs after molding, and errors occur in the dimensions of the machining object formed as a molding due to wears and tears of the mold for molding.

The distance between such a machining object and the machining apparatus is measured for each machining surface of the machining object by a distance measurement sensor placed on the arm of the machining apparatus. Further, the machining data is corrected for each machining surface by the correction section based on the measurement result by the distance measurement sensor.

Thus, in the present configuration, since correction of machining data according to the deviation between a machining region of the machining object indicated by the machining data and an actual machining region is performed for each machining surface based on the measurement result of the distance between the machining object and the machining apparatus, it is possible to perform the correction of machining data in correspondence to deviation of the machining object with higher accuracy.

In the above described first aspect, it is preferable that the machining data is divided by the machining surfaces and is stored in the storage section, and the correction section corrects the machining data divided by the machining surfaces, based on the measurement result by the distance measurement sensor.

According to the present configuration, machining data is divided by the machining surfaces, and the machining data divided by the machining surfaces is corrected based on a measurement result by the distance measurement sensor. When the machining data is not divided by the machining surfaces, a specific machining surface is set to be a reference surface, and if a manufacturing error has occurred between the machining surface which serves as the reference surface and another machining surface in an actual machining object, machining accuracy for the another machining surface will deteriorate. In contrast, when the machining data is divided by the machining surfaces, the machining surfaces and the reference surfaces can be always equalized, thereby enabling more accurate machining.

In the above described first aspect, it is preferable that the distance measurement sensor measures the distance between the machining surface and the machining apparatus at at least two locations, and the correction section calculates a rotational center of deviation between an actual position of the machining object and a position thereof indicated by the machining data based on a measurement result by the distance measurement sensor, and corrects the machining data based on the rotational center.

According to the present configuration, the machining data is corrected based on a rotational center of the deviation between an actual position of the machining object and a position thereof indicated by the machining data. As a result of this, the present configuration can correct the machining data with higher accuracy since it corrects machining data by calculating even the posture, that is, inclination of the machining object.

In the above described first aspect, it is preferable that upon measurement of the distance between a predetermined one of the machining surfaces and the machining apparatus with the distance measurement sensor, a measurement position of the predetermined one of the machining surfaces is modified based on a deviation occurred on another of the machining surfaces.

Even if measurement by a distance measurement sensor is performed on a predetermined machining surface at a prespecified measurement position, when a deviation between a measurement result by the distance measurement sensor and machining data has occurred on another machining surface, there is possibility that the distance between the predetermined machining surface and the machining apparatus is not correctly measured. For example, even if it is intended to measure the distance to a center position of a machining surface, when the machining object is inclined, there is possibility that the distance measurement sensor measures a position higher or lower than the center position of the machining surface. With use of a measurement result based on such measurement, it is not possible to accurately correct the machining data.

Therefore, according to the present configuration, upon measurement of the distance between a predetermined machining surface and the machining apparatus with the distance measurement sensor, the measurement position of the predetermined machining surface is modified based on a deviation occurred on another machining surface. Thus, since the distance measurement sensor will perform measurement of the distance to the machining surface at a modified measurement position, the present configuration can correct the machining data with higher accuracy.

In the above described first aspect, the correction section moves a center position of the machining object indicated by the machining data to a center position of the actual machining object, and performs correction by rotating the machining data after the center position is moved, based on a measurement result by the distance measurement sensor.

According to the present configuration, since a center position of a machining object indicated by machining data is moved to a center position of an actual machining object, and with the center position being as a reference, the machining data is rotated to be corrected based on a measurement result by the distance measurement sensor, it is possible to correct the machining data with higher accuracy.

In the above described first aspect, it is preferable that the distance measurement sensor measures a reference distance which is the distance between the machining surface of reference and the machining apparatus, and the correction section corrects the machining data for all the machining surfaces based on the reference distance, and further corrects the machining data for each of the machining surfaces.

If an error has originally occurred in the distance between the machining object and the machining apparatus with respect to an ideal value, an error will also occur in subsequent correction for each machining surface.

Accordingly, according to the present configuration, machining data for all the machining surfaces is corrected based on a reference distance which is a distance between the machining surface of reference and the machining apparatus to eliminate deviation in the distance between the machining object and the machining apparatus, and further the machining data is corrected for each machining surface.

Therefore, the present configuration can correct machining data with higher accuracy.

In the above described first aspect, it is preferable that the distance measurement sensor measures a distance to a prespecified reference position for a plurality of different postures of the arm, and is thereby calibrated such that no error occurs in the measurement of distance in different postures of the arm.

In the arm of the machining apparatus, a driving error occurs in each actuator for driving a joint, and the driving error as the entire arm is given as accumulated value of driving errors which has occurred in each actuator. Therefore, a measurement result by the distance measurement sensor placed in the arm also includes such driving errors. Moreover, since as the posture of the arm (posture of the machining apparatus) varies, the driving quantity and the driving error of each actuator also vary, driving errors included in a measurement result by the distance measurement sensor also varies according to the posture of the arm.

Accordingly, according to the present configuration, a distance between a prespecified reference position and the distance measurement sensor is measured for each different posture of the arm, and the distance measurement sensor is calibrated such that no error occurs in the measurement of distance at different postures of the arm. As a result of this, the present configuration can correct machining data with higher accuracy.

A machining apparatus relating to a second aspect of the present invention includes an arm provided with a machining tool for machining a machining object at multiple joints, and the control device described above.

A correction method of machining data relating to a third aspect of the present invention is a correction method of machining data indicating a machining region of a machining object by use of a machining apparatus including a multi-joint arm provided with a machining tool, the method including: a first step of measuring a distance between the machining object and the machining apparatus for each machining surface of the machining object with a distance measurement sensor placed on the arm; and a second step of correcting the machining data for each of the machining surfaces based on a measurement result by the distance measurement sensor.

Advantageous Effects of Invention

The present invention has an advantageous effect that it can perform the correction of machining data in correspondence to deviation of a machining object with higher accuracy.

BRIEF DESCRIPTION OF DRAWINGS

FIG. 18 is a schematic diagram to show a case in which coordinates of an ideal center position of the workpiece are moved to coordinates of an actual center position of the workpiece relating to the fourth embodiment of the present invention.

DESCRIPTION OF EMBODIMENTS

Hereafter, embodiments of a control device for a machining apparatus, a machining apparatus, and a correction method of machining data relating to the present invention will be described with reference to the drawings.

First Embodiment

Hereafter, a first embodiment of the present invention will be described.

Figure 1:
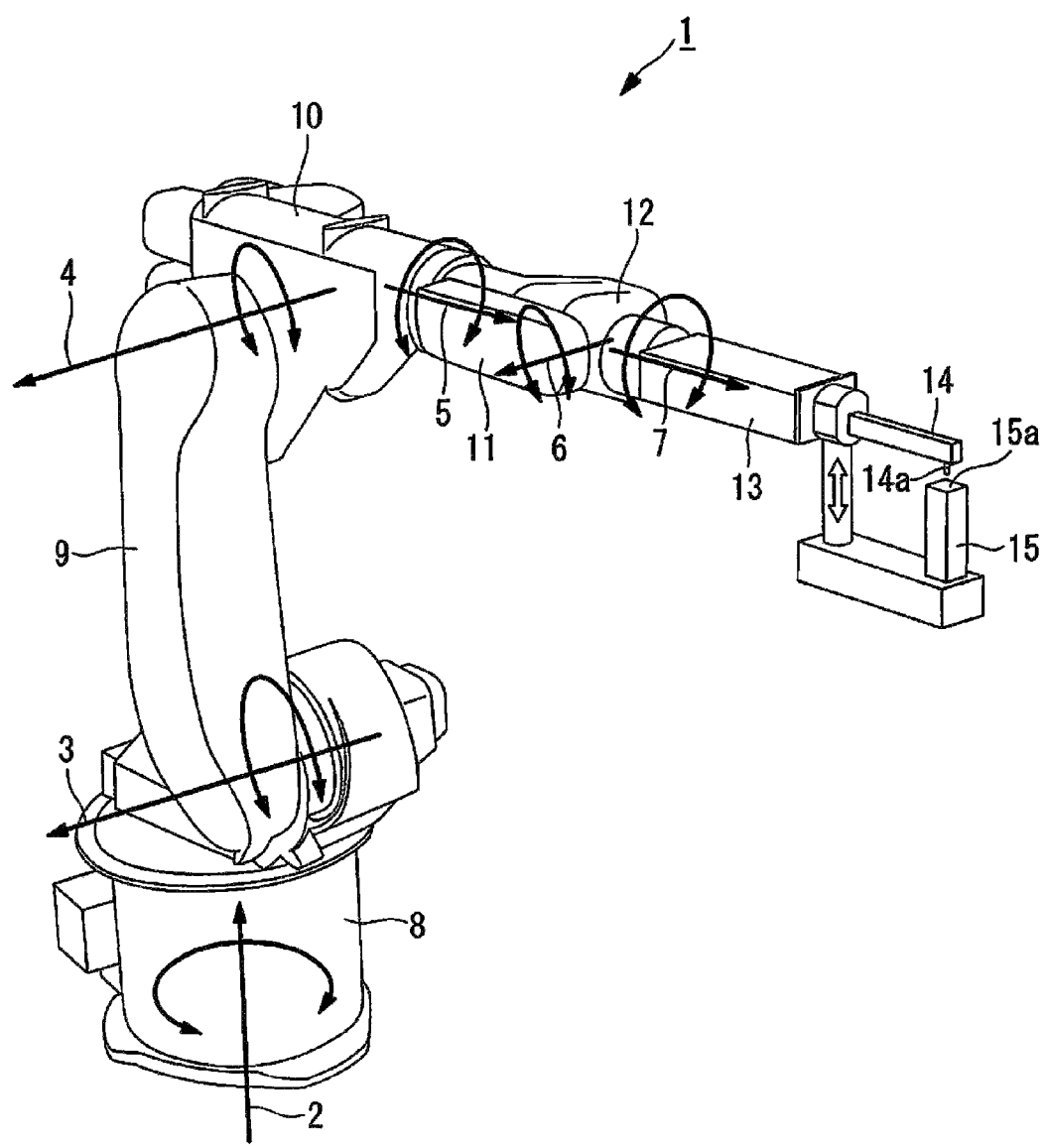
FIG. 1 is an outline view of a machining apparatus relating to a first embodiment of the present invention.

FIG. 1 is an outline view of a machining apparatus 1 for machining a workpiece which is a machining object.

The machining apparatus 1 is, as an example, an industrial 6-axis robot (vertical multi-joint robot) including a swivel base 8, and arms 9, 10, 11, 12, which pivot about rotational axis denoted by symbols 2, 3, 4, 5, 6, 7 in FIG. 1, wherein an abrasive nozzle assembly 14 and a catcher cup 15 are attached to a distal end part (an end part opposite to the side on which the arm 12 is connected) of a valve unit 13. It is noted that, in the following description, when the arms 9, 10, 11, 12 are not distinguished from each other, they are simply referred to as an "arm".

Ultrahigh pressure water mixed with an abrasive (polishing agent) is ejected from an exit 14a of the abrasive nozzle assembly 14 (also referred to as a "machining tool"), the exit 14a being opposed to an entrance 15a of the catcher cup 15, and the ultrahigh pressure water containing the abrasive, which has been ejected from the exit 14a of the abrasive nozzle assembly 14, is recovered into the catcher cup 15 via the entrance 15a. Moreover, a height (length in the longitudinal direction (the up-and-down direction in FIG. 1)) dimension in a distal end part (end part of the exit 14a side) of the abrasive nozzle assembly 14 is set between 55 mm and 24 mm depending on the size of the workpiece, and a width (length in the thickness direction (direction normal to the rotational axis 7)) dimension is set between 25 mm and 10 mm.

Upon machining (for example, cutting) a workpiece with the machining apparatus 1, the abrasive nozzle assembly 14 and the catcher cup 15 are disposed at a predetermined position with respect to the workpiece, and ultrahigh pressure water containing an abrasive is ejected from the exit 14a of the abrasive nozzle assembly 14. Then, the abrasive nozzle assembly 14 and the catcher cup 15 are moved to cut the workpiece.

Figure 2:
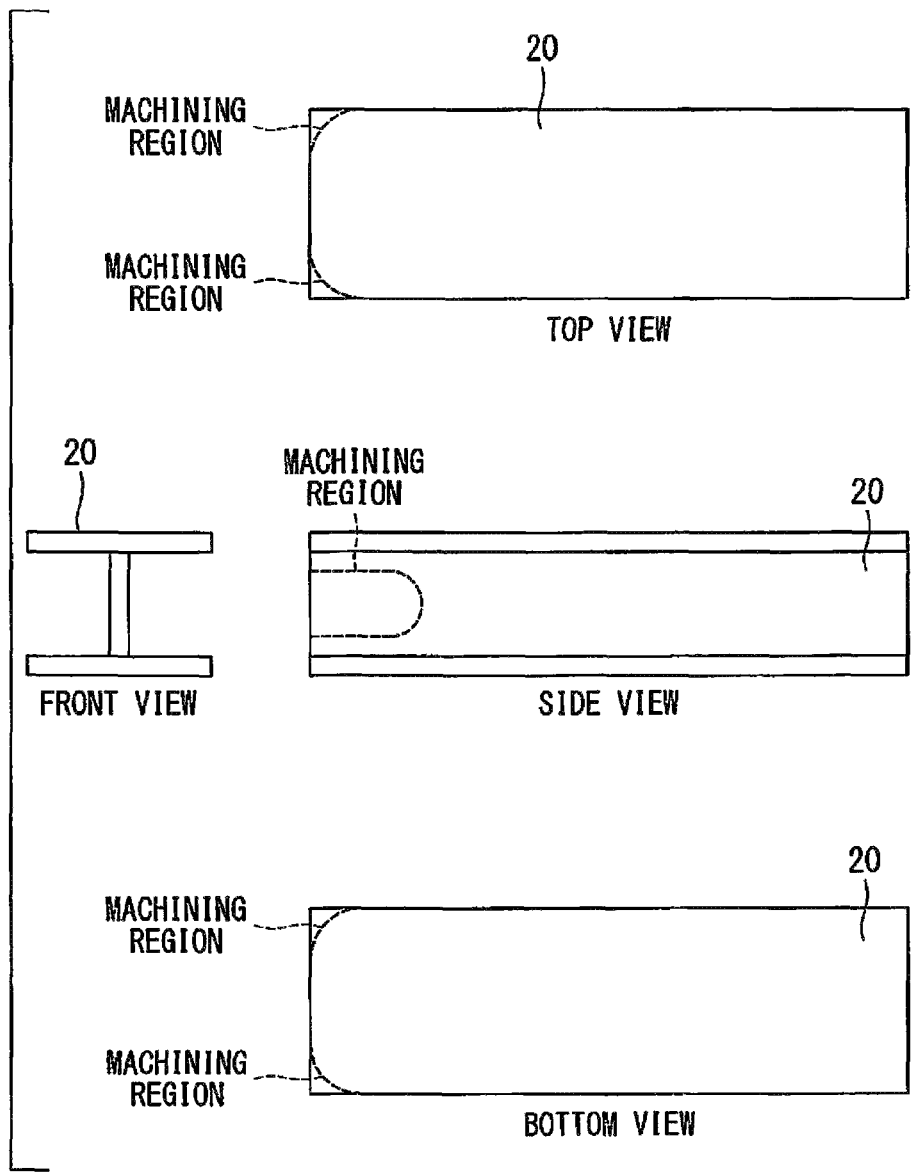
FIG. 2 is a diagram to show an example of a workpiece to be machined by the machining apparatus relating to the first embodiment of the present invention.

FIG. 2 is a diagram to show an example of a workpiece 20 relating to the present first embodiment. The workpiece 20 is, for example, a long-size member having a length corresponding to a wing length of the aircraft main wing in the lengthwise direction, and a sectional shape as shown in the front view of FIG. 2. Moreover, the workpiece 20 is, for example, formed of carbon fiber reinforced plastics: CFRP in which carbon fiber and resin are combined.

The machining apparatus 1 performs machining to cut a broken line part (machining region) in one end part of the workpiece 20 as shown in the top view, side view, and bottom view of FIG. 2, for example.

Figure 3:
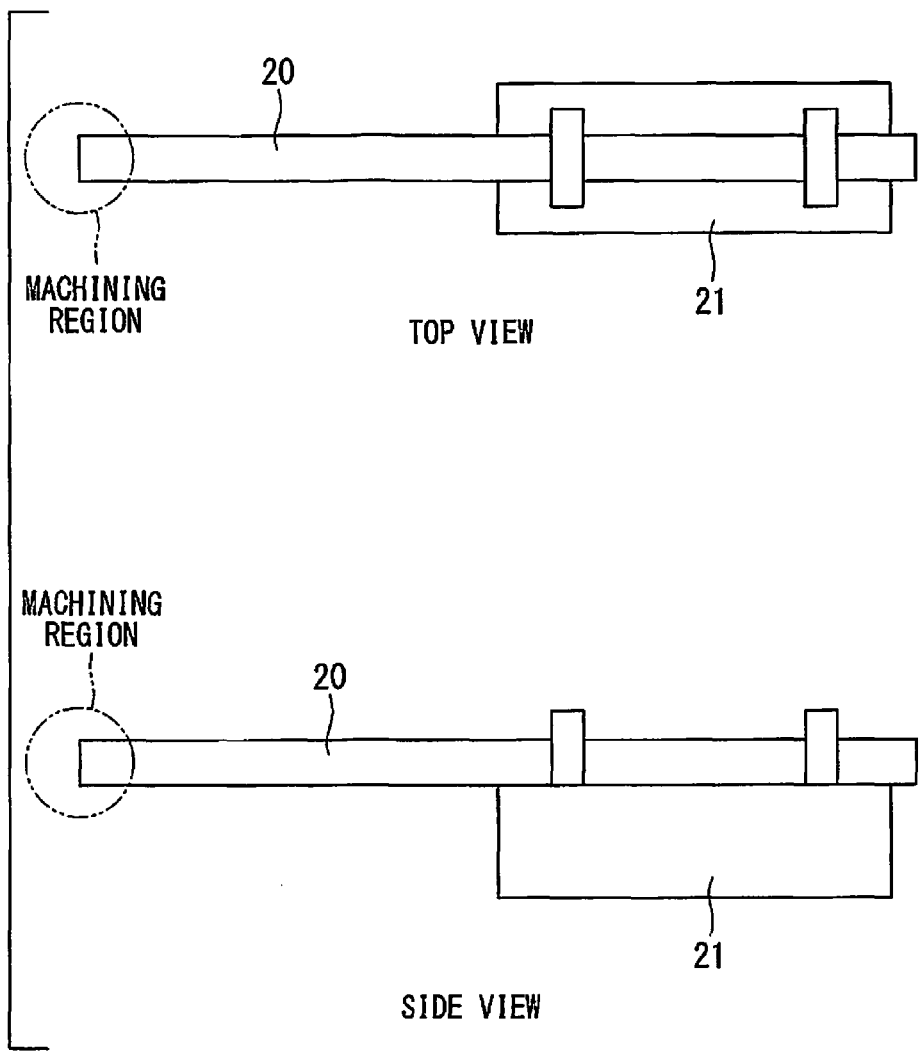
FIG. 3 is a diagram to show a securing method of a workpiece to be machined by the machining apparatus relating to the first embodiment of the present invention.

To machine one end part of the workpiece 20 as described above, in the present first embodiment, only the other end part, which has no machining region, of the workpiece 20 is secured by a jig 21 as shown in FIG. 3. As a result of this, the workpiece 20 is secured in a cantilever fashion and there is possibility that deflection (inclination and torsion) occurs at the machining region.

Figure 4:
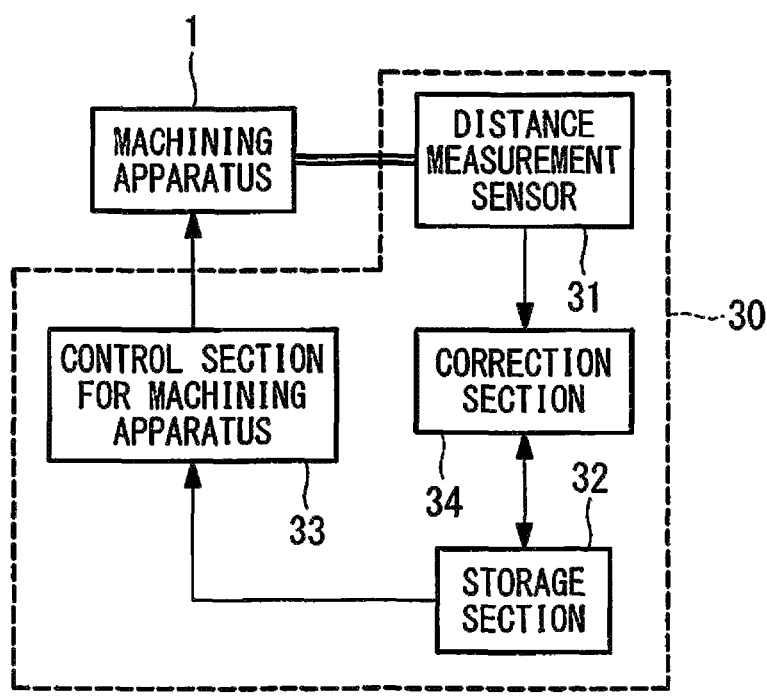
FIG. 4 is a functional block diagram to show the function of a control device for a machining apparatus relating to the first embodiment of the present invention.

FIG. 4 is a functional block diagram to show the function of a control device 30 of the machining apparatus 1 relating to the present first embodiment.

The control device 30 includes a distance measurement sensor 31, a storage section 32, a control section for machining apparatus 33, and a correction section 34.

The distance measurement sensor 31 is placed on the arm of the machining apparatus 1 to measure the distance to the workpiece 20. It is noted that the distance measurement sensor 31 is placed on a valve unit 13 to which the abrasive nozzle assembly 14 is attached. Moreover, in the present first embodiment, the distance measurement sensor 31 is assumed to be a noncontact sensor (a laser sensor) as an example.

Figure 5:
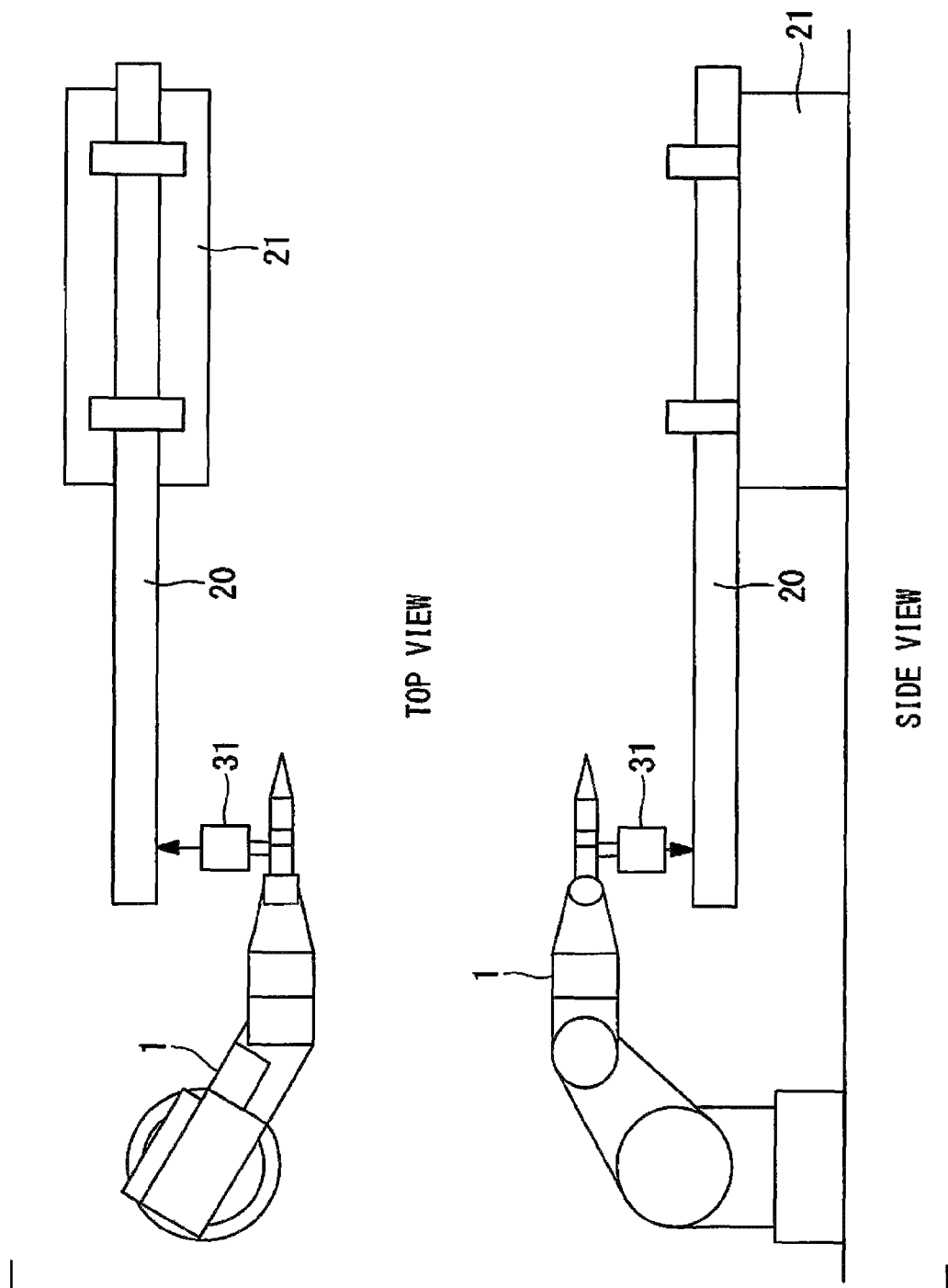
FIG. 5 is a diagram to show a measurement example by a distance measurement sensor relating to the first embodiment of the present invention.

FIG. 5 is a diagram to show a measurement example of distance by the distance measurement sensor 31. The distance measurement sensor 31 measures the distance between the machining surface and the machining apparatus 1 for each machining surface of the workpiece 20. That is, as shown in the top view of FIG. 5, when a side face of the workpiece 20 is machined, the distance measurement sensor 31 measures the distance between the side face of the workpiece 20 and the machining apparatus 1. Further, as shown in the side view of FIG. 5, when a top face of the workpiece 20 is machined, the distance measurement sensor 31 measures the distance to the top face of the workpiece 20.

Here, in the arm of the machining apparatus 1, a driving error occurs in each actuator for driving the joint, and the driving error for the entire arm will be an accumulated value of driving errors which have occurred in each actuator. Although the distance measurement sensor 31 is placed within a back-lash and dimensional tolerance of the machining apparatus 1 with respect to the machining apparatus 1, a measurement result of distance will include the above described driving errors. Further, since as the posture of the arm (posture of the machining apparatus 1) varies, the driving quantity and the driving error of each actuator vary, driving errors included in a measurement result by the distance measurement sensor 31 also varies according to the posture of the arm.

Accordingly, in the present first embodiment, a distance between a prespecified reference position and the distance measurement sensor 31 is measured for each different posture of the arm, and the distance measurement sensor 31 is calibrated such that no error occurs in the measurement of distance at different postures of the arm.

Next, a calibration method of the distance measurement sensor 31 will be described.

Generally, a tool center point (which is a reference position, and is hereafter referred to as "TCP") of a machining tool is calibrated by using a reference target, etc. The distance measurement sensor 31 is also calibrated by a similar method as shown in FIG. 6.

Figure 6:
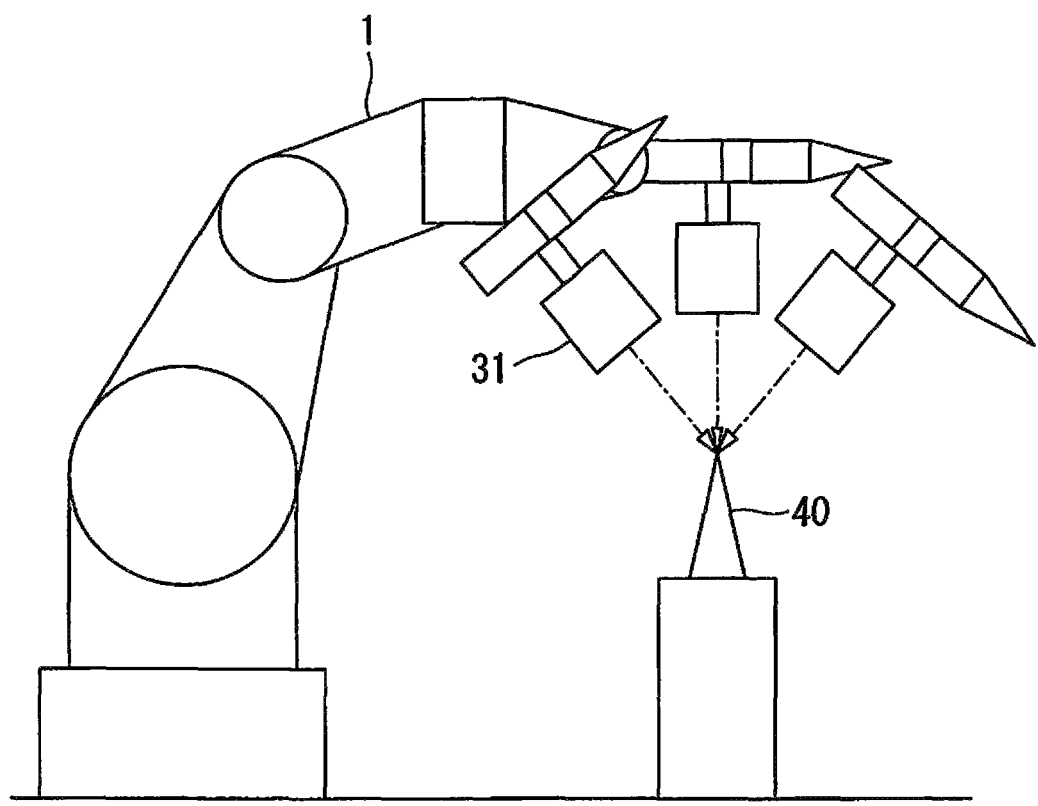
FIG. 6 is a diagram required for illustrating a calibration method of the distance measurement sensor relating to the first embodiment of the present invention.

As shown in FIG. 6, the machining apparatus 1 causes the distance measurement sensor 31 to confront a target 40 as the reference position, at a plurality of different postures of the arm and to measure distances. Then, a sum of an indication value (a position of the distance measurement sensor 31) of the machining apparatus 1 and a measurement result by the distance measurement sensor 31 are calculated. Then, a difference between this sum and an actual distance to the target 40 is calculated as an error, and the TCP of the distance measurement sensor 31 is calculated based on the error. The measurement result of the distance measurement sensor 31 is modified based on the calculated TCP to give a correct measurement result.

As a result of performance of such calibration of distance measurement sensor 31 as described above, even if the position and posture of the machining apparatus 1 are varied, the distance between the workpiece 20 and the machining apparatus 1 is accurately measured, thereby increasing the accuracy of the correction of machining data to be described later in detail.

The storage section 32 stores machining data (which is a machining program and is hereafter referred to as "NC data") indicating machining regions of the workpiece 20 performed by the machining apparatus 1.

The control section for machining apparatus 33 controls the machining apparatus 1 based on the NC data stored in the storage section 32 to machine the workpiece 20.

The correction section 34 corrects NC data for each machining surface of the workpiece 20 based on a measurement result of the distance measurement sensor 31.

The control section for machining apparatus 33 and the correction section 34 are made up of, for example, a CPU (Central Processing Unit), a RAM (Random Access Memory), and a computer readable recording medium, etc. Then, a series of processing to realize various functions of the control section for machining apparatus 33 and correction section 34 is recorded, as an example, in a recording medium, etc. in a form of program, and the CPU realizes various functions by reading out this program to the RAM etc. and performing information processing/arithmetic operation of information.

Here, NC data is created from design nominal values (indicated values on the drawing) of the machining apparatus 1, the jig 21, and the workpiece 20. However, the machining apparatus 1 has a positioning error, and the jig 21 has part's dimensional tolerance, etc. Moreover, when the workpiece 20 has been subjected to machining by a different machining apparatus in a previous stage, the workpiece 20 has a manufacturing error. Further, when the workpiece 20 is a plastic molding or a casting etc., there is possibility that the machining surface itself of the workpiece 20 is deformed. For this reason, if the workpiece 20 is machined by the machining apparatus 1 by using NC data created from design nominal values without any correction, it becomes more likely that a machining error occurs in the workpiece 20.

Moreover, when the workpiece 20 is cantilevered by the jig 21 as shown in FIG. 3, the area which rigidly supports the workpiece 20 is located apart from the machining region, and there is possibility that deflection occurs at the machining region of the workpiece 20 due to its own weight.

Accordingly, in the control device 30 relating to the present first embodiment, the distance between the workpiece 20 and the machining apparatus 1 is measured for each machining surface of the workpiece 20 by the distance measurement sensor 31 placed in the machining apparatus 1, and NC data is corrected for each machining surface by the correction section 34 based on the measurement result by the distance measurement sensor 31.

It is noted that the NC data relating to the present first embodiment is divided by the machining surfaces of the workpiece 20 when a plurality of machining surfaces to be machined by the machining apparatus 1 are present for the workpiece 20. If the NC data is not divided by the machining surfaces, a specific machining surface is set to be the reference surface, and when a manufacturing error (for example, angular error) occurs between the machining surface which serves as the reference surface and another machining surface at an actual position of the workpiece 20, the machining accuracy for the another machining surface deteriorates. In contrast, if the machining data is divided by the machining surfaces, the machining surfaces and the reference surfaces can be always equalized, thereby enabling machining with higher accuracy.

Particularly, dividing NC data is suitable for the machining of a machining surface for which establishing a reference surface is difficult when the NC data is not divided.

A machining surface for which establishing a reference surface is difficult is, for example, a bottom face of the workpiece 20 which is machined without changing the posture and position of the workpiece 20. This is because in NC data which is not divided by the machining surfaces, the bottom face of the workpiece 20 is not set to be the reference surface, and the top face or side face is set to be the reference surface.

Another example in which establishing a reference surface is difficult is a workpiece 20 which has a plurality of machining surfaces at one end thereof as shown in FIG. 2. When one end has a plurality of machining surfaces, since the machining apparatus 1 needs to bring the machining tool closer to the machining surface from vertical and horizontal directions, the workpiece 20 is supported in a cantilever fashion as shown in FIG. 3 without being supported in the vicinity of the machining region, and thus it becomes difficult to establish a reference surface.

It is noted that all the NC data which has been divided is created such that values, each of which is obtained by extending a design nominal value, overlap with each other between NC data of each machining surface. When there is no such overlap, NC data of the machining surface has been deviated with respect to another machining surface so that accurate machining cannot be performed.

Next, correction processing of NC data will be described by taking an example of a case in which a workpiece 20 supported in a cantilever fashion as shown in FIG. 3 is machined.

Figure 7:
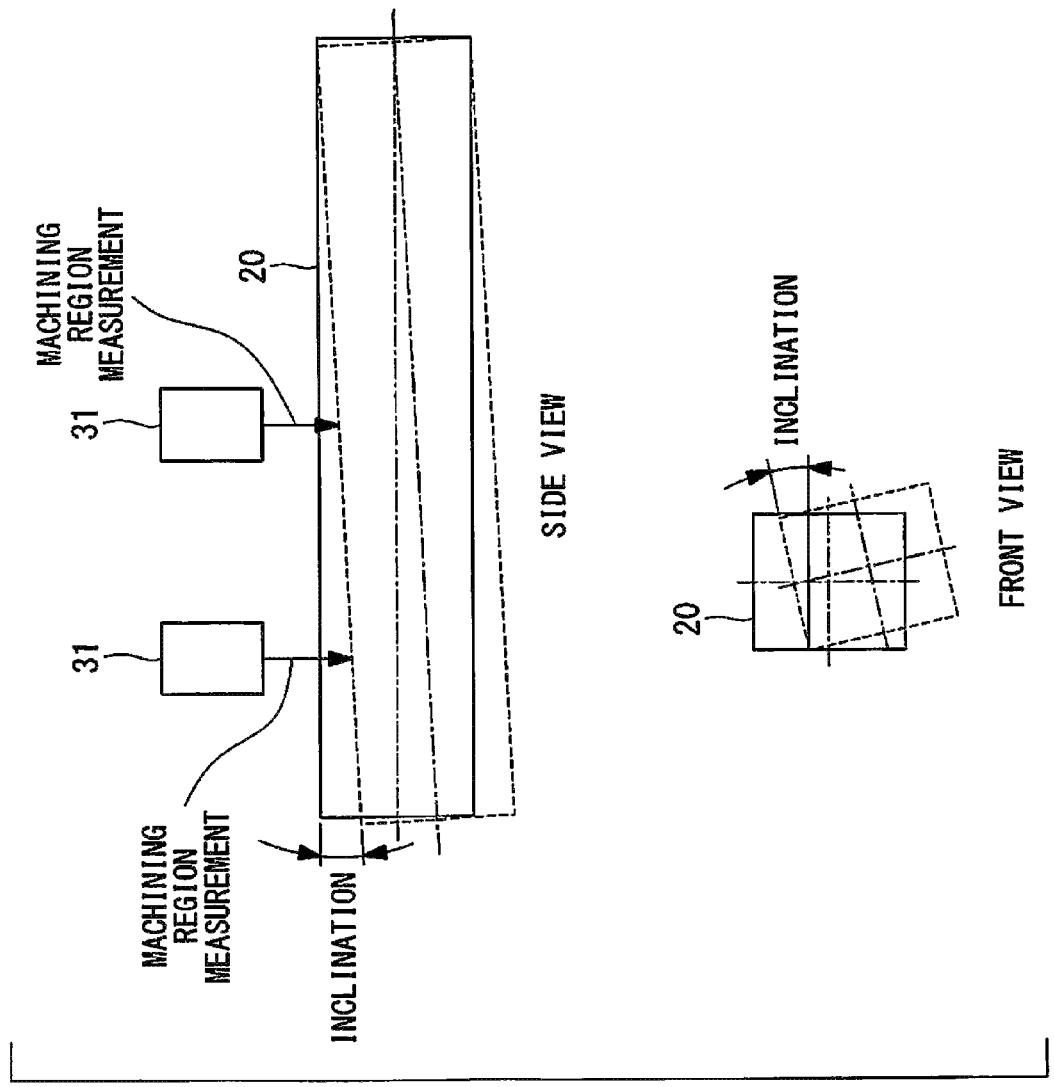
FIG. 7 is a diagram to show a state of a machining region of a workpiece supported in a cantilever fashion, relating to the first embodiment of the present invention.

FIG. 7 is a diagram to show a state of a machining region of a workpiece 20 supported in a cantilevered fashion.

As shown in FIG. 7, the workpiece 20 supported in a cantilever fashion may incline by its own weight. Such inclination includes an inclination in which the workpiece 20 is deflected by its own weight and the distal end thereof droops down as shown in the side view of FIG. 7, and an inclination (torsion) into rightward rotation or leftward rotation as shown in the front view. In this way, in the workpiece 20 supported in a cantilever fashion, a deviation may occur in its posture and position. It is noted that a deviation in posture is a deviation in the rotational direction of the workpiece 20, and a deviation in position is a deviation in the height direction and horizontal direction of the workpiece 20.

To correct an inclination which has occurred in the workpiece 20, the distance measurement sensor 31 measures the distance between the machining surface of the workpiece 20 and the machining apparatus 1 at at least 2 locations, and the correction section 34 calculates a rotational center of deviation between the position of the workpiece 20 and the position thereof indicated by the NC data based on a measurement result by the distance measurement sensor 31, and corrects the NC data based on the rotational center.

Figure 8:
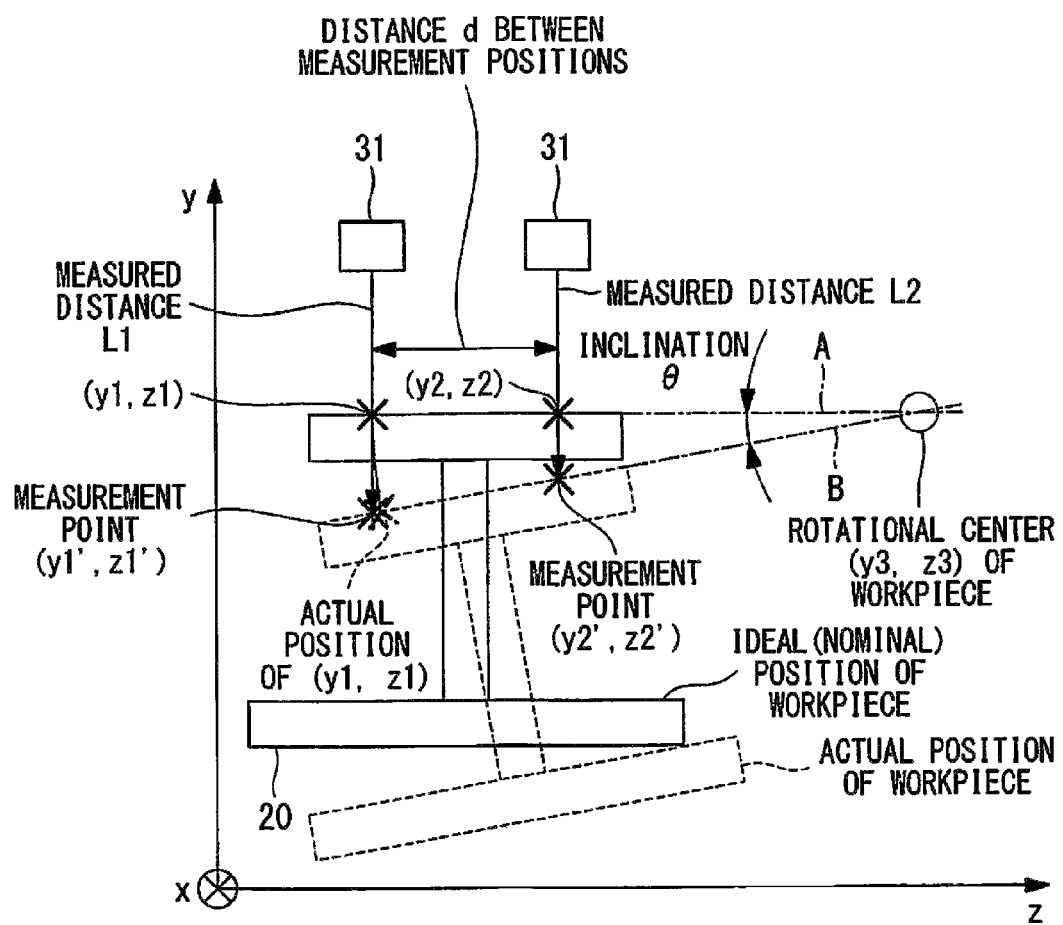
FIG. 8 is diagram required for illustrating correction of NC data in correspondence to a diagram showing an inclined workpiece, relating to the first embodiment of the present invention.

Referring to FIG. 8, correction of NC data will be described in more detail.

FIG. 8 represents a front face of the workpiece 20 by a yz coordinate system, a height direction by a y axis, a lateral direction by a z axis, and a depth direction by an x axis. It is noted that the position of the workpiece 20 indicated by solid lines in FIG. 8 is an ideal position of the workpiece 20 where no inclination has occurred, and the position of the workpiece 20 indicated by broken lines in FIG. 8 shows an actual position of the workpiece 20 where inclination has occurred.

To determine an inclination θ of the workpiece 20, as shown in FIG. 8, the distance measurement sensor 31 measures the distance between the top face of the workpiece 20 and the machining apparatus 1 at 2 locations in the z direction.

In this measurement, it is supposed that a measurement point corresponding to a measured distance L1 is (y1', z1'), a measurement point corresponding to a measured distance L2 is (y2', z2'), and an interval between the two measurement points is a distance d between measurement positions. It is noted that a design nominal value (NC data) corresponding to the measurement point (y1', z1') is (y1, z1), and a design nominal value (NC data) corresponding to the measurement point (y2', z2') is (y2, z2), where the following relationships hold: y1=y2, z1=z1', and z2=z1+d=z2'.

Moreover, a one-dot chain line A in FIG. 8 is an extension line A in the z direction of the top face of the workpiece 20 in an ideal position, and is represented by the following formula (1).

$$y = y1 = y2 \tag{1}$$

Further, a one-dot chain line B in FIG. 8 is an extension line B in the z direction of the top face of the workpiece 20 in an actual position, and is represented by the following formula (2).

$$y = \frac{y1' - y2'}{z1' - z2'} \times z + \left(y1' - \frac{y1' - y2'}{z1' - z2'} \times z1'\right) \tag{2}$$

That is, an intersection point between the extension line A and the extension line B is the rotational center of the workpiece 20, and an angle formed by the workpiece 20 with the extension line A and the extension line B is an inclination θ of the workpiece 20.

Further, the design nominal value (y1, z1) and the measurement point (y1', z1') cannot be treated as the same position in the workpiece 20 in an ideal position and the workpiece 20 in an actual position. This is because the workpiece 20 in inclined, and the actual position (y1, z1) of the workpiece 20 corresponding to the design nominal value (y1, z1) can be determined from the following formula (3) by using the inclination θ.

$$y1 = y1 - (z3-z1) \times \sin\theta$$

$$z1 = z1 + (z3-z1) \times (1-\cos\theta) \quad (3)$$

It is noted that when the inclination θ is small, the design nominal value (y2, z2) and the measurement point (y2', z2') cam be treated as the same position in the workpiece 20 in an ideal position and the workpiece 20 in an actual position.

In this way, when rotational correction is performed on NC data, it is necessary to take into consideration the position of rotational center. If the rotational center is not taken into consideration, the NC data agrees with the actual posture of the workpiece 20, but it is deviated from the position of the workpiece 20.

Figure 9:
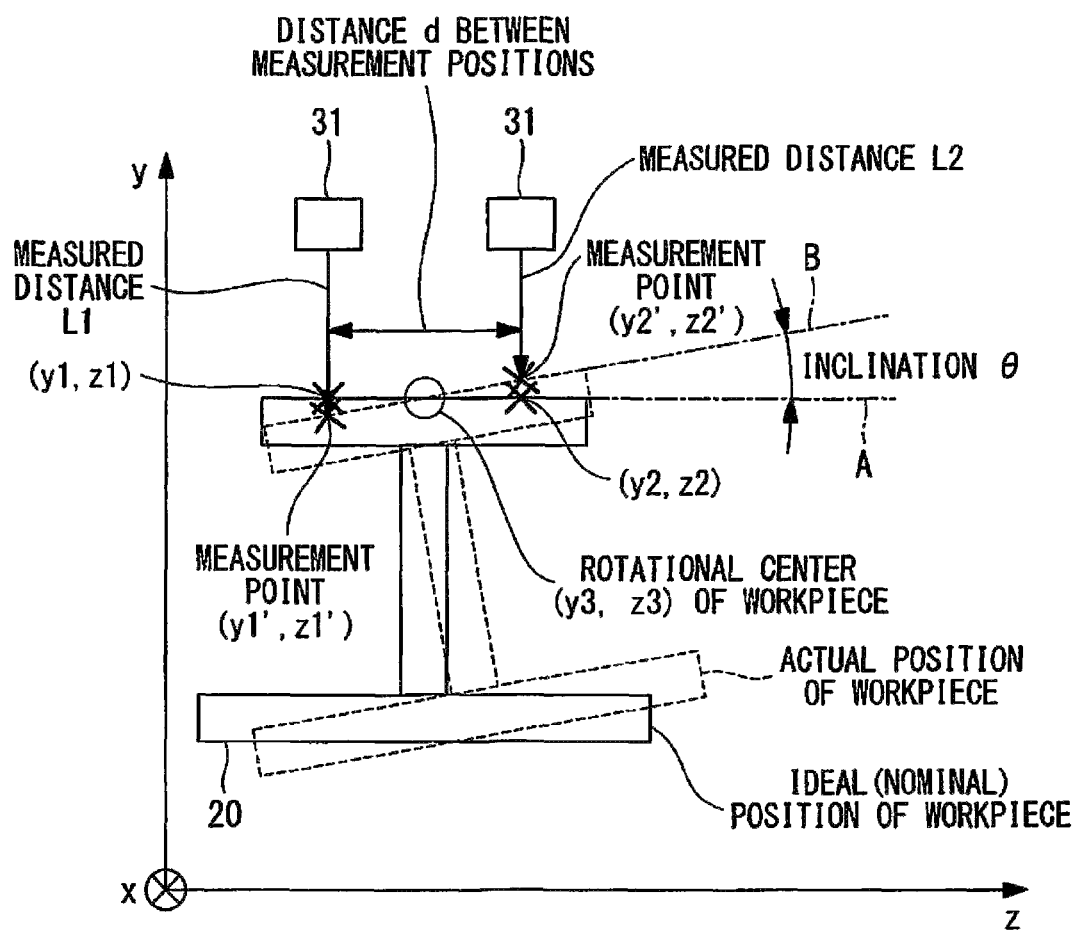
FIG. 9 is a diagram to show another example of an inclined workpiece, relating to the first embodiment of the present invention.

For example, even if the inclination θ is the same, the position of the workpiece 20 after coordinate transformation will differ between the case where the rotational center is located on the workpiece 20 as shown in FIG. 9 and the case where the rotational center is not located on the workpiece 20 as shown in FIG. 8. Therefore, the position of the rotational center is crucial for coordinate transformation.

Although correction processing of NC data corresponding to the front face of the workpiece 20 has been described so far, such correction by rotation of coordinate system is also performed on other machining surfaces in a similar manner.

In this way, in the correction processing relating to the present first embodiment, the workpiece 20 will be machined not by adjusting the inclination and manufacturing errors etc. of the workpiece 20 to the coordinate system of the machining apparatus 1, but by adjusting the machining apparatus 1 to the coordinate system of the workpiece 20.

For example, when the workpiece 20 is secured in a cantilever fashion as shown in FIG. 3 and the entire surface of the unsecured portion is machined, even if the workpiece 20 is inclined, it is not possible to newly install a jig for modifying it. In such a case, the machining apparatus 1 can machine the workpiece 20 by adjusting the machining apparatus 1 to the coordinate system of the workpiece 20, that is, by adjusting the machining apparatus 1 to the inclination of the workpiece 20.

Figure 10:
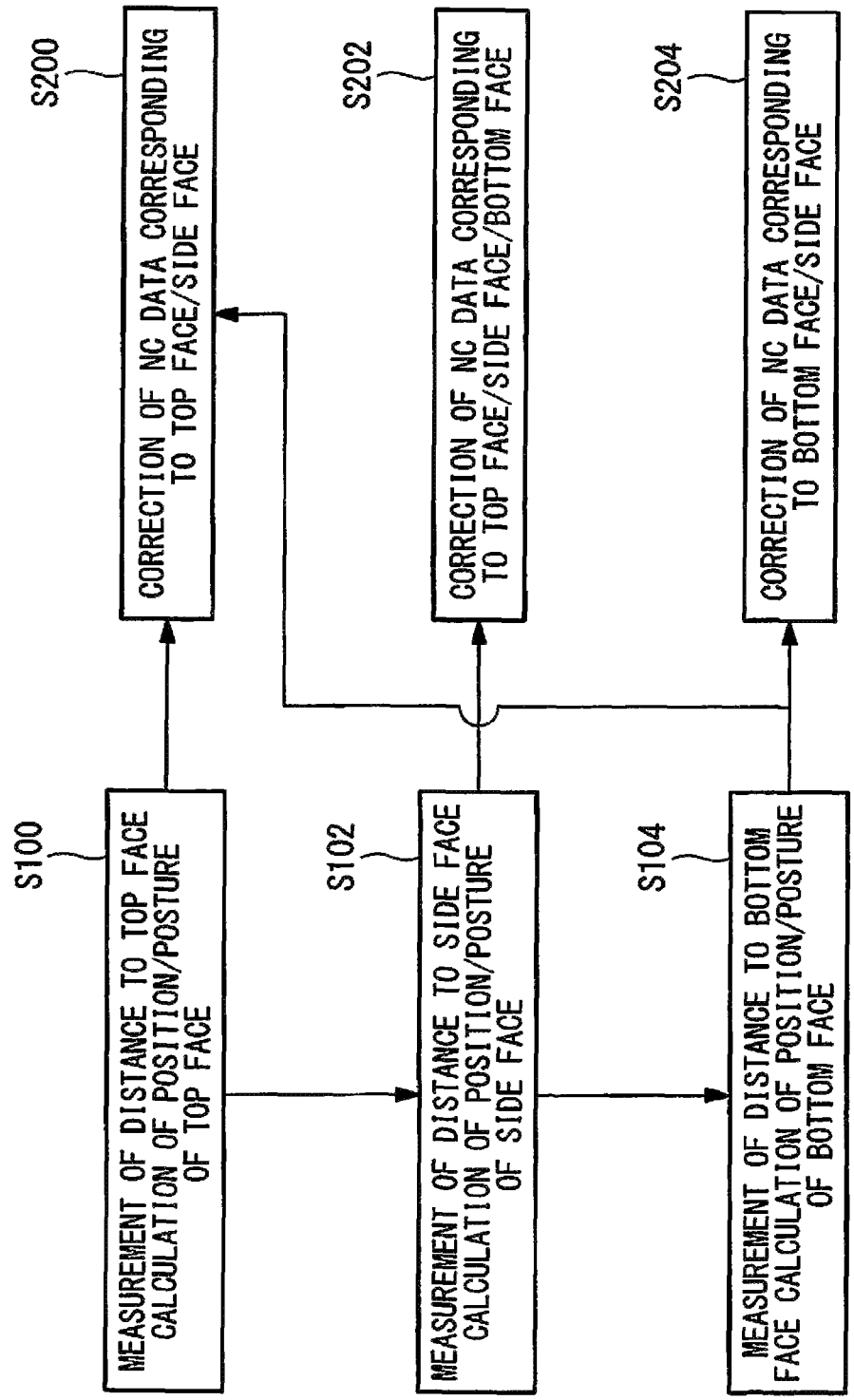
FIG. 10 is a flowchart to show the flow of correction processing relating to the first embodiment of the present invention.

FIG. 10 is a flowchart to show the flow of correction processing relating to the present first embodiment.

First, in step 100, the distance to the top face is measured by the distance measurement sensor 31, and the position and the posture of the top face are calculated by the correction section 34. It is noted that the distance to the top face corresponds to a height position of the top face. In step 100, the top face is measured at at least 2 locations by the distance measurement sensor 31.

Next, in step 102, the distance to the side face (the right side face and left side face) is measured by the distance measurement sensor 31 and the position and posture of the side face are calculated by the correction section 34. It is noted that the distance to the side face corresponds to a horizontal position of the side face. In step 102 relating to the present first embodiment, each side face is measured at only one location by the distance measurement sensor 31, that is, only the position of the machining surface is calculated. However, this is not limiting and when a workpiece width of the side face is sufficiently large, measurement may be made at two or more locations to calculate the posture of the machining surface.

Next, in step 104, the distance to the bottom face is measured by the distance measurement sensor 31 and the position and posture of the bottom face are calculated by the correction section 34. It is noted that the distance to the bottom face corresponds to a height position of the bottom face. In step 104, the bottom face is measured at at least 2 locations by the distance measurement sensor 31.

Then, in step 200, correction of NC data corresponding to the top face and the side face is performed by the correction section 34 based on the calculation results in steps 100 and 104.

Specifically, for the NC data corresponding to the top face, the correction section 34 corrects the posture (inclination) of the machining tool about the x axis, the posture of the machining tool about the z axis, the position of the machining tool in the y axis direction, and the position of the machining tool in the z axis direction. Moreover, for the NC data corresponding to the right side face or the left side face, the correction section 34 corrects the posture of the machining tool about the x axis, the posture of the machining tool about the z axis, the position of the machining tool in the y axis direction, and the position of the machining tool in the z axis direction.

In step 202, correction of NC data corresponding to the top face, the side face, and the bottom face is performed by the correction section 34 based on the calculation result in step 102.

Specifically, the correction section 34 corrects the position of the machining tool in the z axis direction for the NC data corresponding to the top face, the position of the machining tool in the z axis direction for the NC data corresponding to the side face, and the position of the machining tool in the z axis direction for the NC data corresponding to the bottom face.

In step 204, correction of NC data corresponding to the side face and the bottom face is performed by the correction section 34 based on the calculation result in step 106.

Specifically, for the NC data corresponding to the bottom face, the correction section 34 corrects the posture of the machining tool about the x axis, and the posture of the machining tool about the z axis. Moreover, for the NC data corresponding to the right side face or the left side face, the correction section 34 corrects the position of the machining tool in the y axis direction, and the position of the machining tool in the z axis direction.

It is noted that in the above described correction processing, each NC data is corrected in such a way to circle around the circumference of the workpiece 20. For this reason, it is preferable that the correction section 34 performs correction such that the correction of the circumference of the workpiece 20 is consistent between its start and end as it uses the calculation result in step 104 for the correction of NC data in step 200.

As so far described, the control device 30 for the machining apparatus 1 relating to the present first embodiment includes: a storage section 32 for storing NC data indicating a machining region of the workpiece 20 by the machining apparatus 1; a distance measurement sensor 31 placed on the arm and for measuring a distance between the workpiece 20 and the machining apparatus 1 for each machining surface of the workpiece 20; and a correction section 34 for correcting the NC data for each of the machining surfaces based on a measurement result by the distance measurement sensor 31.

Since, in this way, the control device 30 performs correction of NC data corresponding to the deviation between a machining region of the workpiece 20 indicated by the NC data and an actual machining region for each machining surface based on the measurement result of the distance between the workpiece 20 and the machining apparatus 1, it is possible to perform the correction of NC data in correspondence to deviation of the workpiece 20 with higher accuracy.

Second Embodiment

Hereafter, a second embodiment of the present invention will be described.

It is noted that since the configurations of the machining apparatus 1 and the control device 30 relating to the present second embodiment are the same as those of the machining apparatus 1 and the control device 30 relating to the first embodiment shown in FIGS. 1 and 4, description thereof will be omitted.

Even if measurement by a distance measurement sensor 31 is performed on a predetermined machining surface at a prespecified measurement position (hereafter, referred to as a "sensor position"), when a deviation between a measurement result by the distance measurement sensor 31 and NC data has occurred on another machining surface, there is possibility that the distance between the predetermined machining surface and the machining apparatus 1 is not correctly measured. For example, even if it is intended to measure the distance to a center position of a machining surface, when the workpiece 20 is inclined, there is possibility that the distance measurement sensor 31 measures a position higher or lower than the center position of the machining surface. With use of a measurement result based on such measurement, it is not possible to accurately correct the NC data.

Accordingly, upon measurement of the distance between a predetermined machining surface and the machining apparatus 1 with the distance measurement sensor 31, the control device 30 relating to the present second embodiment modifies the sensor position of the predetermined machining surface based on a deviation occurred on another machining surface.

Figure 11:
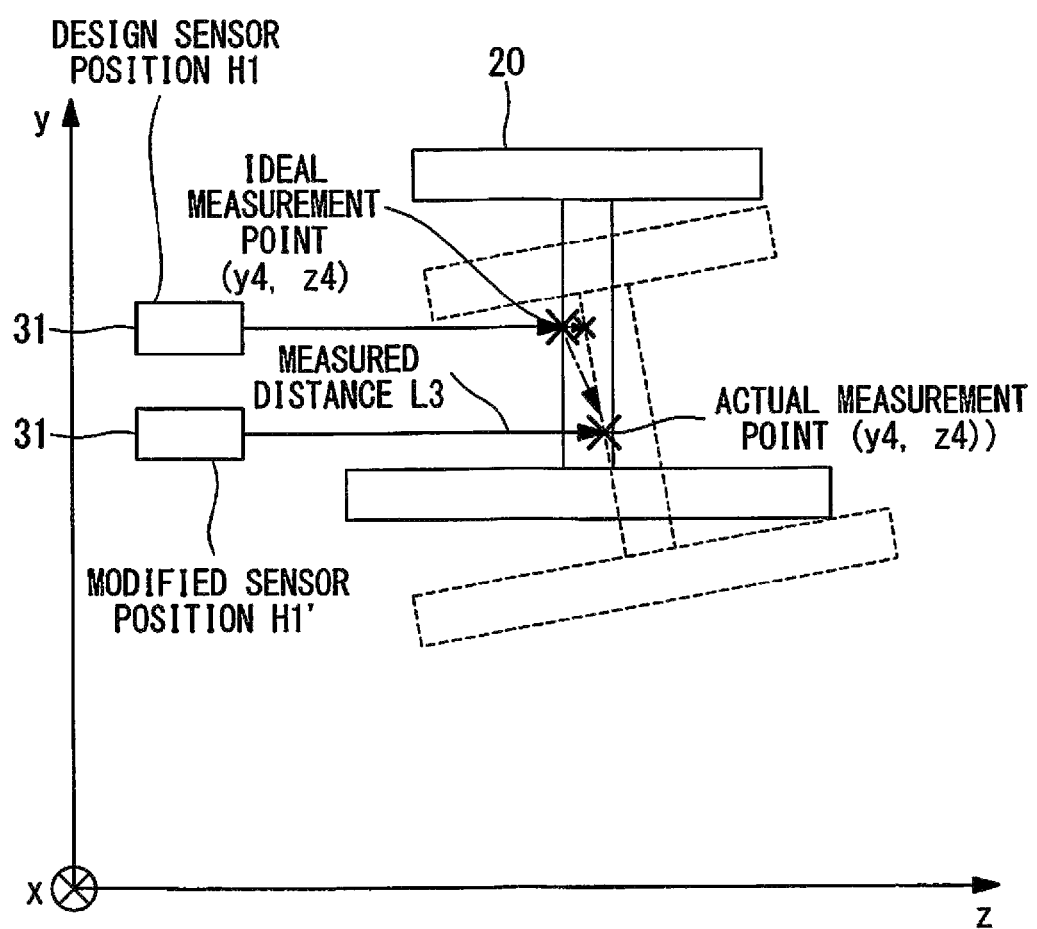
FIG. 11 is a diagram required for illustrating modification of a sensor position relating to a second embodiment of the present invention.

Referring to FIG. 11, modification of the sensor position will be described.

A sensor position based on NC data of a design nominal value corresponding to an ideal position of the workpiece 20 (solid lines in FIG. 11) is a design sensor position H1 (the prespecified sensor position described above). In the example of FIG. 11, the design sensor position H1 is a position for measuring the distance to a longitudinal center position (ideal measurement point (y4, z4)) of a side face of the workpiece 20 when no inclination has occurred in the workpiece 20.

However, if inclination has occurred in the workpiece 20, even if the distance measurement sensor 31 performs measurement at the design sensor position H1, the measurement point is located on an upper part of the side face of the inclined workpiece 20 shown by broken lines of FIG. 11, and gives not the longitudinal center position but an erroneous measurement point, thereby causing measurement errors.

Accordingly, based on an inclination of the workpiece 20 which is calculated in advance, the distance measurement sensor 31 is positioned at a position which is obtained by modifying the design sensor position H1 (hereafter, referred to as a "modified sensor position H1"). As a result of this, the distance measurement sensor 31 will measure the distance to the longitudinal center position of the side face of the inclined workpiece 20 (actual measurement point (y4, z4)).

It is noted that the design sensor position H1 is stored in the storage section 32 in advance in correspondence to each machining surface, and the design sensor position H1 is modified to a modified sensor position H1' by the correction section 34, and the modified sensor position H1' is stored in the storage section 32. Then, when the distance measurement sensor 31 measures the distance to a machining surface, a modified sensor position H1' is read out from the storage section 32, and the machining apparatus 1 is controlled by the control section for machining apparatus 33 to cause the distance measurement sensor 31 placed on the arm to be positioned at the modified sensor position H1'.

Modification of the sensor position will be described more specifically.

First, as described in the correction process relating to the first embodiment, the distance between the top face of the workpiece 20 and the machining apparatus 1 is measured at two locations in the z direction, to determine an inclination θ of the workpiece 20.

Then, a deviation ΔLz of the workpiece 20 in the horizontal direction (z direction) by the inclination θ(hereafter, referred to as "workpiece horizontal deviation") is $(z3-z1) \times \sin^2 \theta$.

On the other hand, it is supposed that a deviation between a measured distance L3, which is a measurement result when the distance measurement sensor 31 is located at the modified sensor position H1', and a measurement result when located at the design sensor position H1 is ΔLw (hereafter, referred to as a "horizontal translational deviation").

That is, a sensor position where the distance measurement sensor 31 is moved in the y direction so that the workpiece horizontal deviation ΔLz corresponds to the horizontal translational deviation ΔLw is the modified sensor position H1' where the distance to actual measurement point (y4, z4) can be measured.

It is noted that when the workpiece horizontal deviation ΔLz and the horizontal translational deviation ΔLw do not correspond to each other, a value of ΔLw−ΔLz is further added to (or subtracted from) a horizontal position of the design nominal value as a correction quantity.

Figure 12:
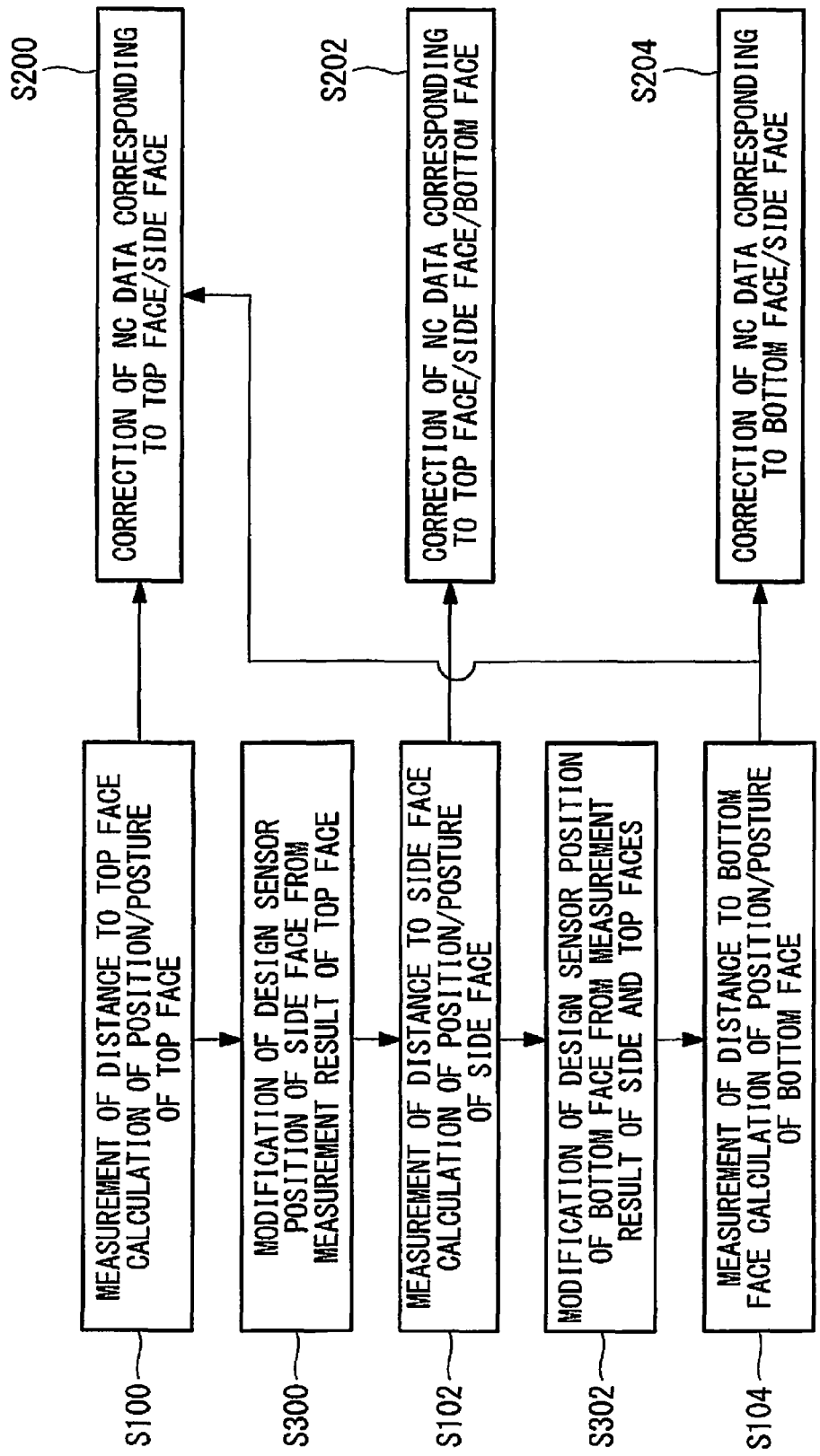
FIG. 12 is a flowchart to show the flow of correction processing relating to the second embodiment of the present invention.

FIG. 12 is a flowchart to show the flow of correction processing relating to the present second embodiment. It is noted that those steps in FIG. 12 which are the same as those in FIG. 10 are denoted by the same symbols as in FIG. 10, and description thereof is partly or fully omitted.

Upon completion of step 100, the correction processing relating to the present second embodiment proceeds to step 300.

In step 300, the design sensor position H1 corresponding to the side face of the workpiece 20 is modified through the measurement result of the top face.

Specifically, the correction section 34 corrects the position in the y axis direction of the design sensor position H1 corresponding to the side face.

Upon completion of step 300, the correction processing relating to the present second embodiment proceeds to step 102.

In step 102, the distance measurement sensor 31 is positioned at the modified sensor position H1' corresponding to the side face, distance to the side face (right side face and left side face) is measured by the distance measurement sensor 31, and the position and posture of the side face are calculated by the correction section 34.

Upon completion of step 102, the correction processing relating to the present second embodiment proceeds to step 302. In step 302, the design sensor position H1 corresponding to the bottom face of the workpiece 20 is modified through measurement results of the side face and top face.

Specifically, the correction section 34 corrects the position in the y axis direction of the design sensor position H1 corresponding to the bottom face based on the measurement result of the top face, and corrects the position in the z axis direction of the design sensor position H1 corresponding to the bottom face based on the measurement result of the side face.

Upon completion of step 302, the correction processing relating to the present second embodiment proceeds to step 104.

In step 104, the distance measurement sensor 31 is positioned at the modified sensor position H1' corresponding to the bottom face, the distance to the bottom face is measured by the distance measurement sensor 31, and the position and posture of the bottom face are calculated by the correction section 34.

It is noted that in the correction processing relating to the present second embodiment, since it is preferable to use a measurement result of the distance to an adjacent machining surface for the correction of the design sensor position H1, it is preferable to perform measurement in the order of, for example, the top face, the side face (right side face or the left side face), and the bottom face as shown in the correction processing of FIG. 12.

As so far described, upon measurement of the distance between a predetermined machining surface and the machining apparatus 1 with the distance measurement sensor 31, the control device 30 of the machining apparatus 1 relating to the present second embodiment modifies the sensor position of the predetermined machining surface based on a deviation occurred on another machining surface. Therefore, the control device 30 relating to the present second embodiment can correct NC data with higher accuracy.

Third Embodiment

Hereafter, a third embodiment of the present invention will be described.

It is noted that since the configurations of the machining apparatus 1 and the control device 30 relating to the present third embodiment are the same as those of the machining apparatus 1 and the control device 30 relating to the first embodiment shown in FIGS. 1 and 4, description thereof will be omitted.

If an error has originally occurred in the distance between the workpiece 20 and the machining apparatus 1 with respect to an ideal value, an error will also occur in subsequent correction for each machining surface.

Accordingly, in the present third embodiment, the distance measurement sensor 31 measures a reference distance which is the distance between a machining surface of reference of the workpiece 20 and the machining apparatus 1, and the correction section 34 corrects NC data for all the machining surfaces, and further corrects the NC data for each machining surface based on the reference distance.

It is noted that the difference between the reference distance and the distance between the distance measurement sensor 31 and the workpiece 20 indicated by a design nominal value is a correction quantity for NC data.

Measurement of the reference distance will be specifically described.

Figure 13:
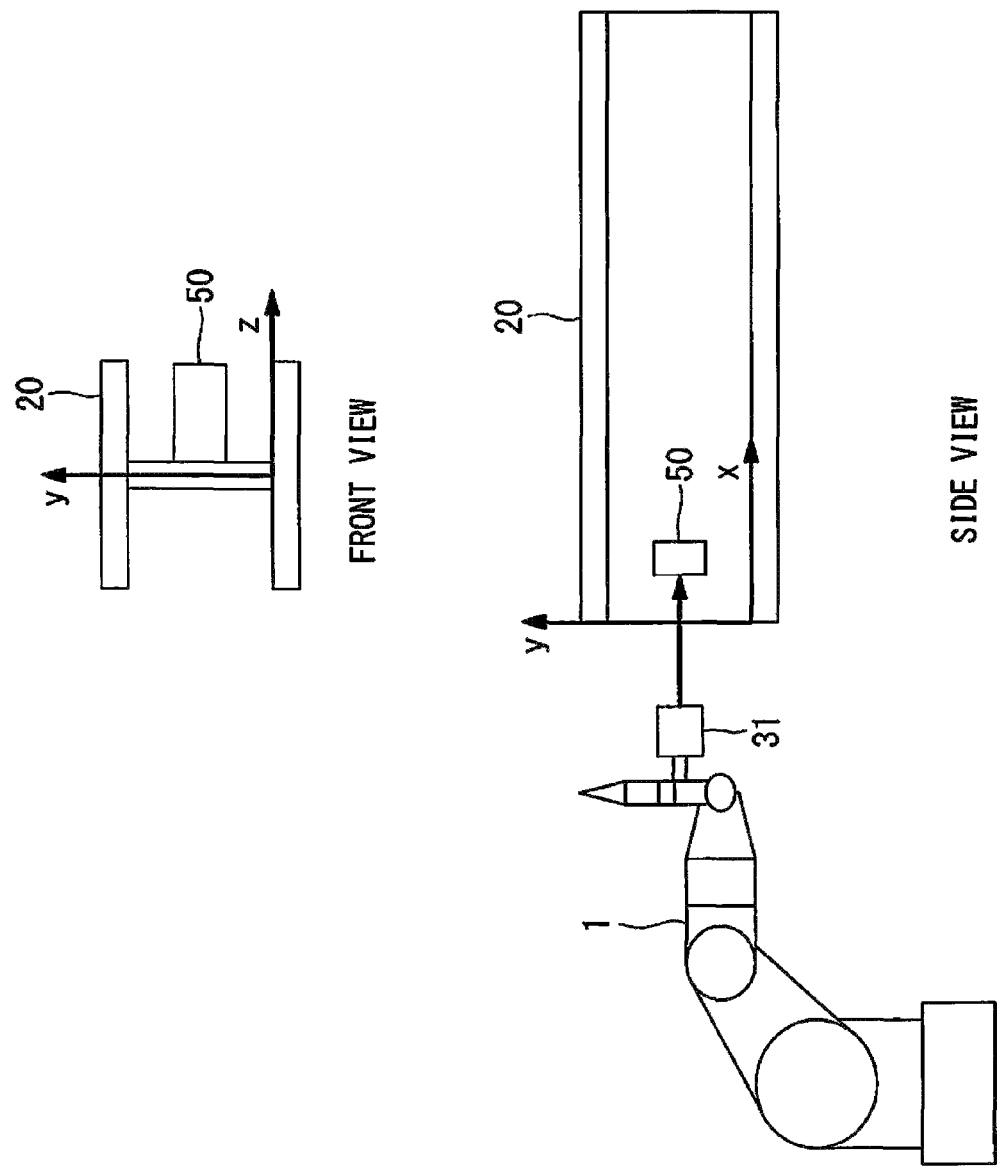
FIG. 13 is a diagram to show a position of a reference member relating to a third embodiment of the present invention.

When the workpiece 20 is one whose front face is machined, the distance to the front face of the workpiece 20 is measured with the front face being as the reference surface (from which a net shape of the workpiece 20 is known, and which is the front face in the example of FIG. 13 shown below) to grasp relative positions in the x direction (which is a direction normal to the reference surface, and is the longitudinal direction in the example of FIG. 13 shown below) of the workpiece 20 and the machining apparatus 1.

It is noted that when the front face is not machined, the workpiece 20 is machined and, taking advantage of the position of a tool hole (also referred to as an index hole) whose position with respect to the workpiece 20 is known, a reference member 50 which serves as a reference for the measurement by the distance measurement sensor 31 is placed in the relevant area as shown in FIG. 13. The reference member 50 is a reflecting plate when the distance measurement sensor 31 is a non-contact sensor (laser sensor), and a non-reflecting jig when the distance measurement sensor 31 is a contact sensor (touch probe).

Figure 14:
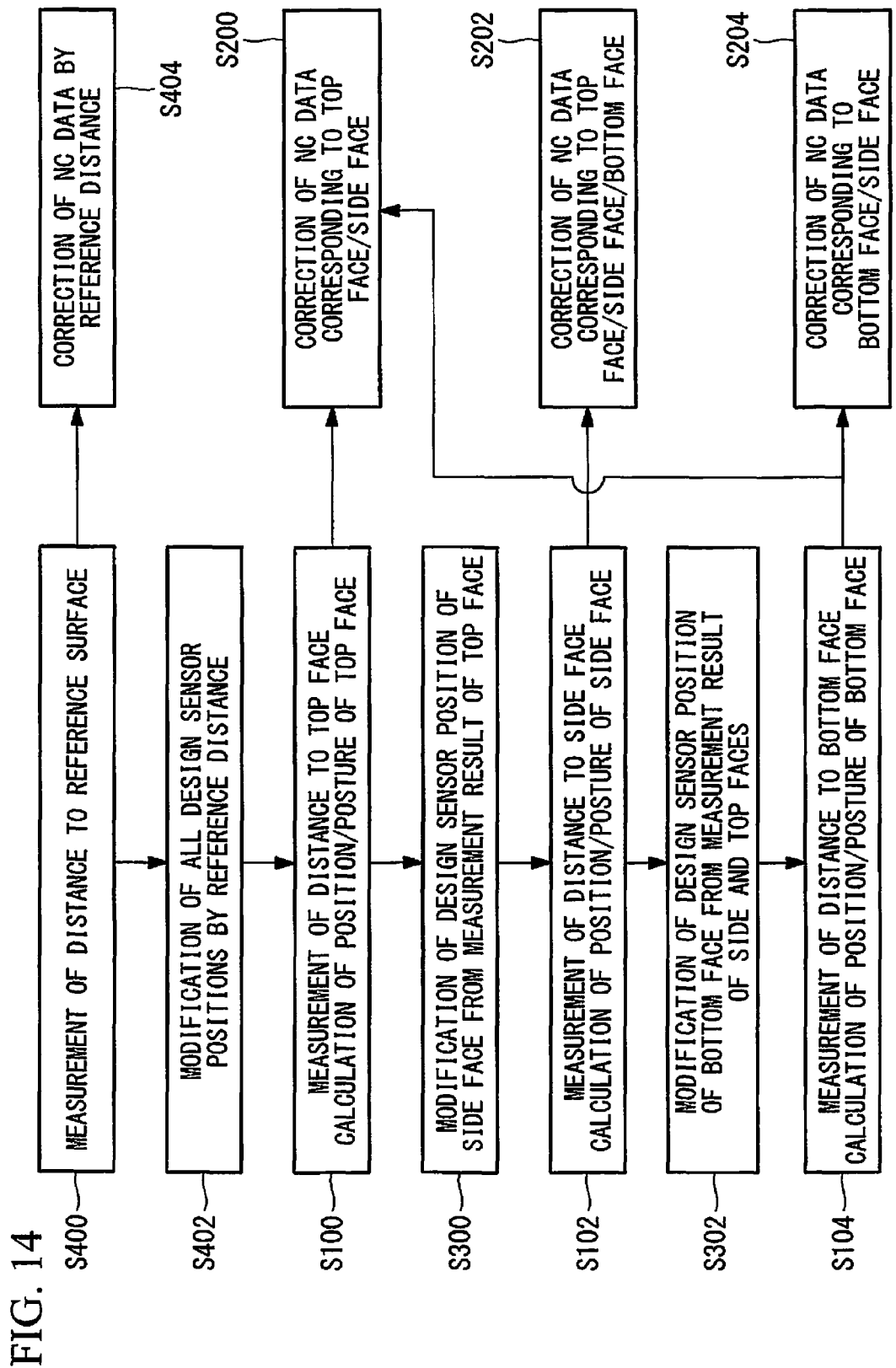
FIG. 14 is a flowchart to show the flow of correction processing relating to the third embodiment of the present invention.

FIG. 14 is a flowchart to show the flow of correction processing relating to the present third embodiment. It is noted that those steps in FIG. 14 which are the same as those in FIG. 12 are denoted by the same symbols as in FIG. 12, and description thereof is partly or fully omitted.

First, in step 400, a reference distance which is the distance to a reference surface or a reference member 50 is measured by the distance measurement sensor 31.

In the following step 402, all the design sensor positions H1 are corrected by the reference distance obtained by the measurement in step 400. That is, in the example of FIG. 14, positions in the x direction of the design sensor positions H1 of the top face, right side face, left side face, and bottom face are corrected based on the reference distance. As a result of this, a deviation in the distance between the workpiece 20 and the machining apparatus 1 is eliminated.

Upon completion of step 402, the correction processing relating to the present third embodiment proceeds to step 100.

Moreover, in step 404, NC data of each machining surface is corrected with the reference distance obtained by the measurement in step 400. That is, in the example shown in FIG. 14, the positions in the x direction of NC data of the upper face, right side face, left side face, and bottom face are modified by the reference distance.

Fourth Embodiment

Hereafter, a fourth embodiment of the present invention will be described.

It is noted that since the configurations of the machining apparatus 1 and the control device 30 relating to the present fourth embodiment are the same as those of the machining apparatus 1 and the control device 30 relating to the first embodiment shown in FIGS. 1 and 4, description thereof will be omitted.

The correction section 34 of the control device 30 relating to the present fourth embodiment moves the center position of the workpiece 20 indicated by NC data to an actual center position of the workpiece 20, and performs correction by rotating the NC data after the center position is moved based on the measurement result by the distance measurement sensor 31.

Figure 15:
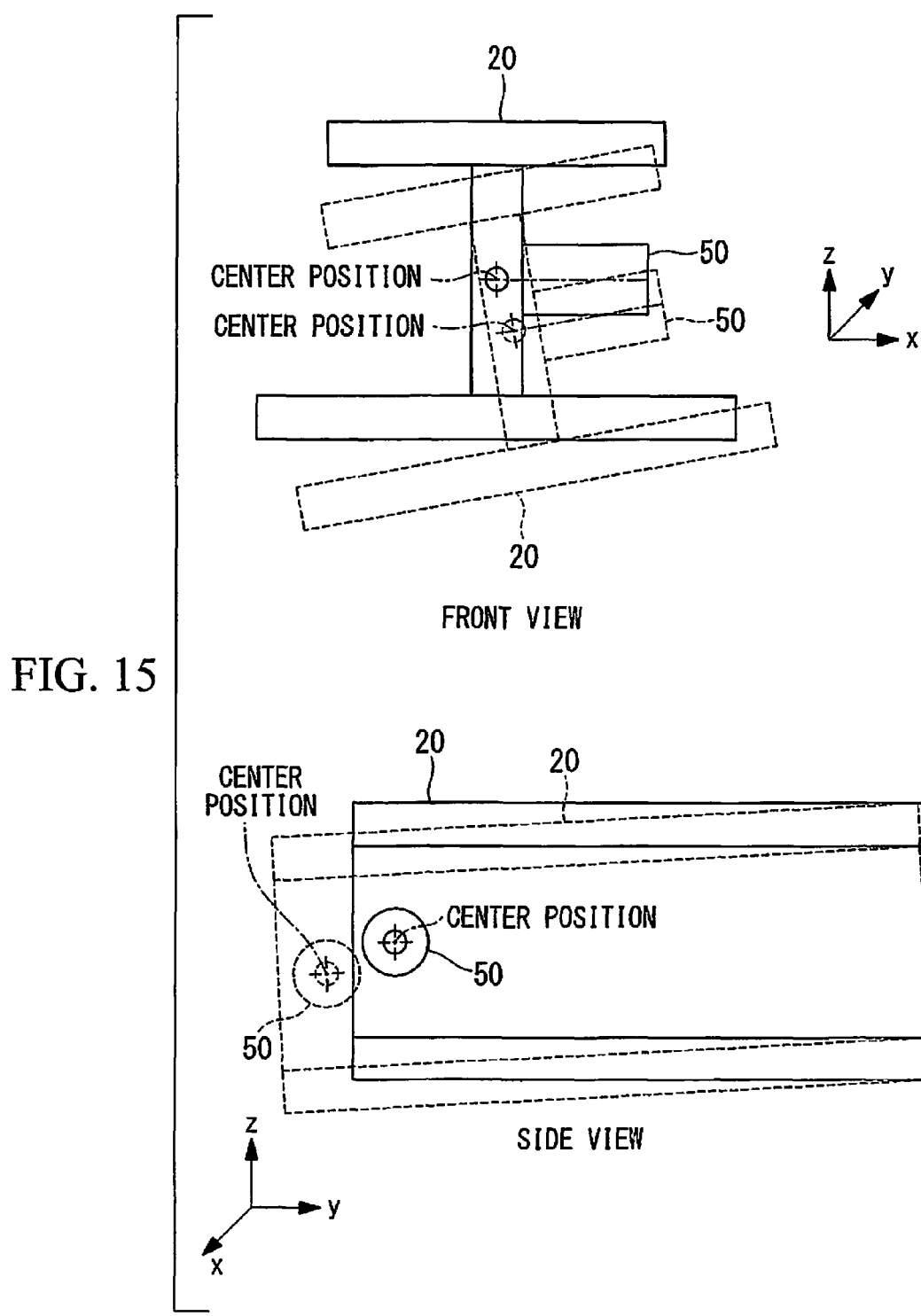
FIG. 15 is a schematic diagram to show a deviation between an ideal position of a workpiece and an actual position of a workpiece relating to a fourth embodiment of the present invention.

FIG. 15 is a schematic diagram to show a deviation between a position of the workpiece 20 indicated by NC data, that is, an ideal position of the workpiece 20 (solid lines of FIG. 15) and an actual position of the workpiece 20 (broken line of FIG. 15). As shown in FIG. 15, a deviation has occurred for the front face and the side face between an ideal center position of the workpiece 20 and an actual center position of the workpiece 20.

Then, in the present fourth embodiment, the center position of the workpiece 20 is identified by means of a reference member 50 which is fitted to the workpiece 20. It is supposed that exact shape of the reference member 50 is known.

Figure 16:
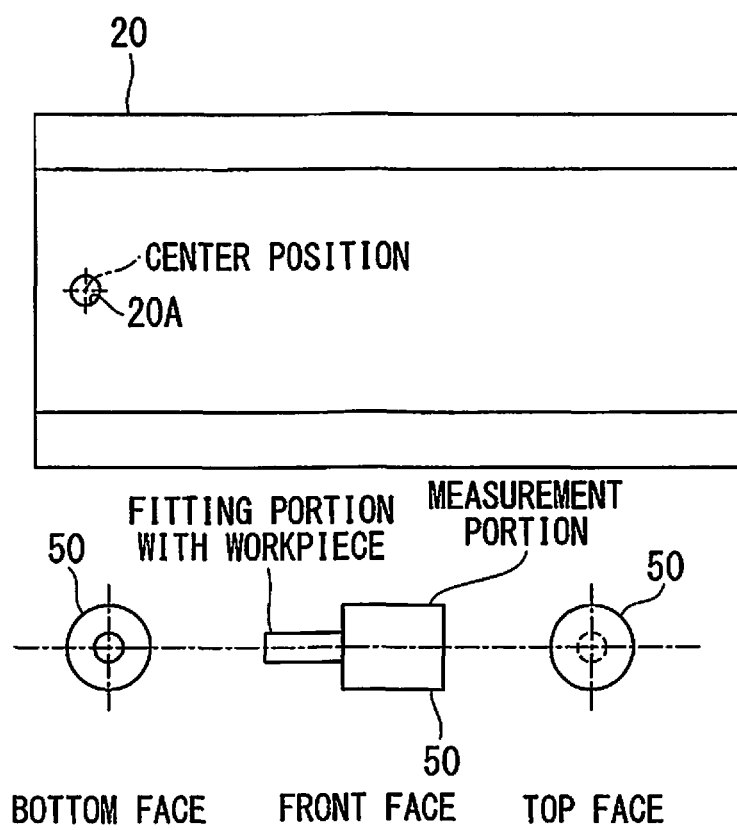
FIG. 16 is a schematic diagram to show the relationship between a center position of a workpiece and a reference member relating to the fourth embodiment of the present invention.

FIG. 16 is a schematic diagram to show the relationship between a center position of a workpiece 20 and a reference member 50 relating to the present fourth embodiment. A reference hole 20A is provided in the workpiece 20, and the center position of the reference hole 20A corresponds to the center position of the workpiece 20. Then, the reference member 50 is fitted to the workpiece 20 such that the center position of the reference hole 20A coincides with the center axis of the reference member 50.

Figure 17:
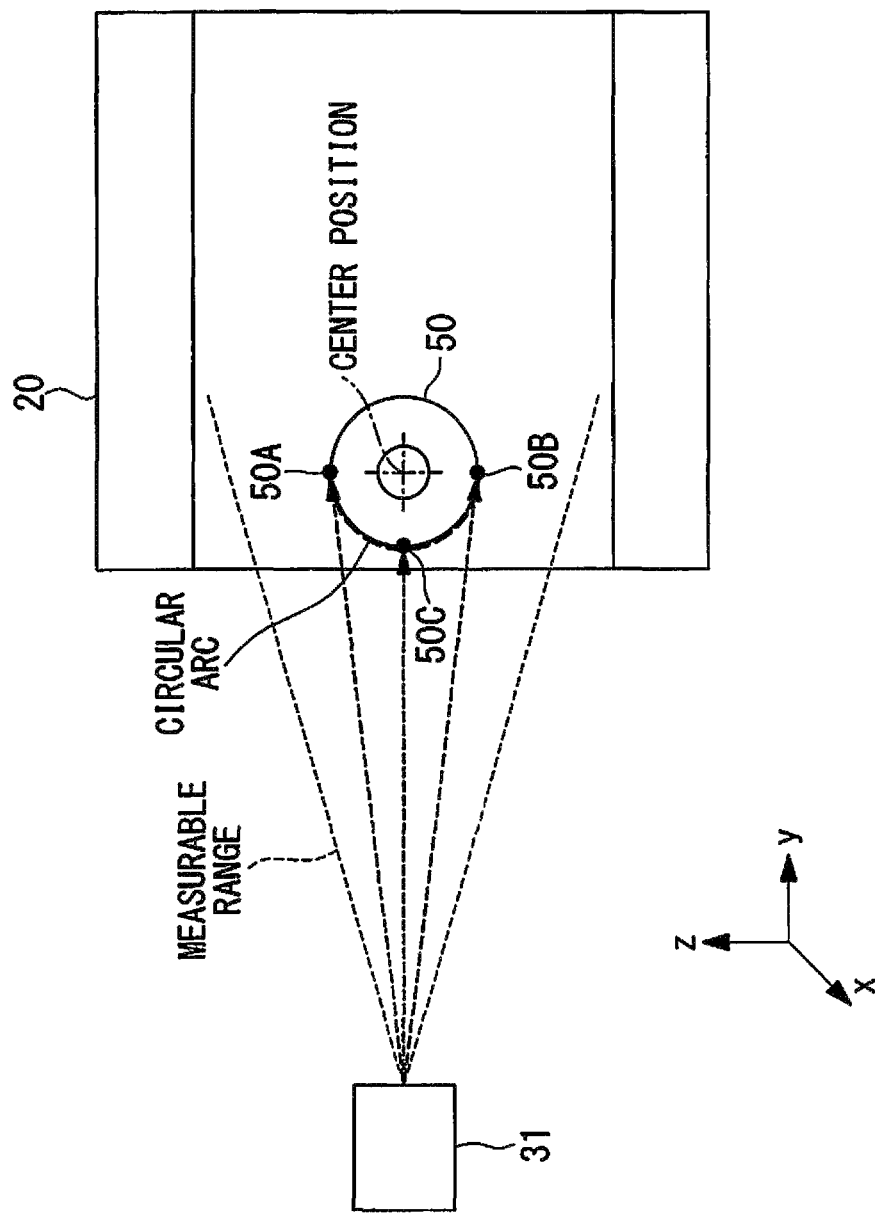
FIG. 17 is a schematic diagram to show an example of a measurement method of the center position of the workpiece relating to the fourth embodiment of the present invention.

FIG. 17 is a schematic diagram to show an example of the measurement method of a center position of a workpiece 20 relating to the present fourth embodiment. The distance measurement sensor 31, which is a laser sensor, scans sensor light within a measurable range, and measures coordinates of furthest measurement points 50A, 50C and a closest measurement point 50B. Then, a shape of a circular arc is geometrically determined from the measurement points 50A, 50B, 50C, and the center of the determined circular arc is identified as the center position of the reference hole 20A of the workpiece 20.

It is noted that in the side view shown in FIG. 17, a case in which y1, z1 are determined as coordinates of the center position of the workpiece 20 is shown. Since the coordinate x1 of the center position is located on an extension line of the central axis of the reference hole 20A, and the width of the front face of the workpiece 20 and the height of the reference member 50 are known, it can be determined by measuring the height position of the reference member 50 by the distance measurement sensor 31.

It is noted that although the shape of the reference member 50 relating to the present fourth embodiment is supposed to be a cylindrical shape, this is not limiting, and other shapes such as a square may be adopted.

Moreover, the measurement method of the center position of the workpiece 20 is not limited to a method by use of the reference member 50, and may be other methods such as, for example, of providing a reference position on the workpiece 20 itself and measuring the center position based on the reference position, and the like.

Then, as shown in FIG. 18, the coordinates of the ideal center positions of the workpiece 20 in all the machining surfaces are moved to the coordinates (x1, y1, z1) of the actual center position of the workpiece 20. This coordinates (x1, y1, z1) of the center position serves as the reference position for correction to be described later.

Next, the distance measurement sensor 31 measures the distance between each machining surface and the machining apparatus 1, and the correction section 34 calculates an angle of deviation between an ideal position of the workpiece 20 and an actual position of the workpiece 20 based on a measurement result by the distance measurement sensor 31 to correct NC data for each machining surface of the workpiece 20 based on the angle (hereafter, referred to as "rotational correction").

Figure 19:
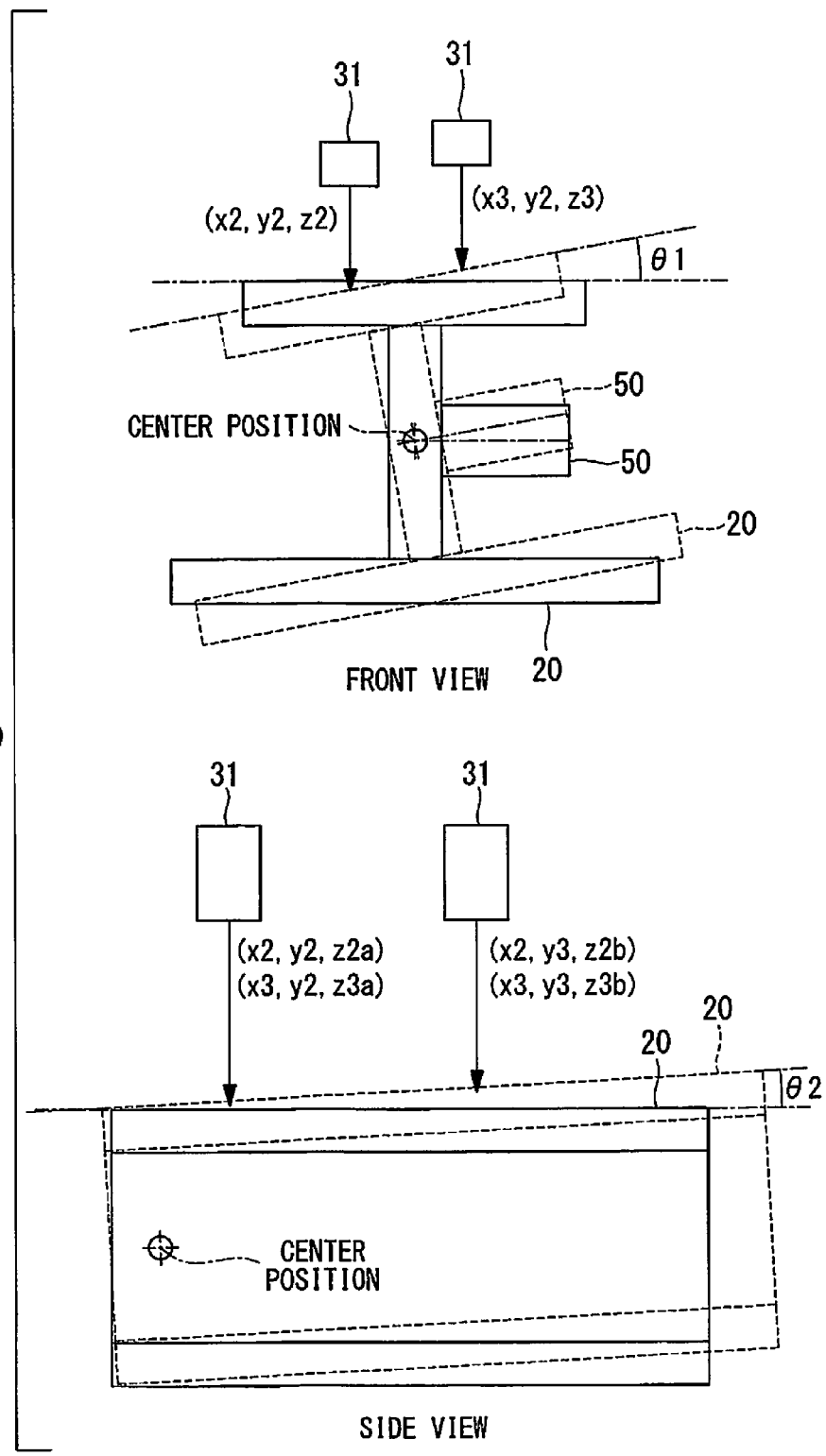
FIG. 19 is a schematic diagram to show a calculation method of an angle of deviation relating to the fourth embodiment of the present invention.

FIG. 19 is a schematic diagram to show a calculation method of an angle of deviation relating to the present fourth embodiment.

It is noted that the measurement to be used for the calculation of angle of deviation, that is, inclination is started from a machining surface which is expected to have a larger inclination. For example, when the workpiece 20 is a stringer to be used in an aircraft, since it is expected that hanging forward phenomenon has occurred, the top face is measured first.

As shown in FIG. 19, an inclination $\Theta 1$ in the x coordinate is calculated from a measurement point (x2, y2, z2) and a measurement point (x3, y2, z3) on the machining surface of the top face. Moreover, an inclination $\Theta 2$ in the y coordinate is calculated from a measurement point (x2, y2, z2a) and a measurement point (x2, y3, z2b), or a measurement point (x3, y2, z3a) and a measurement point (x3, y3, z3b) on the machining surface of the side face.

Figure 20:
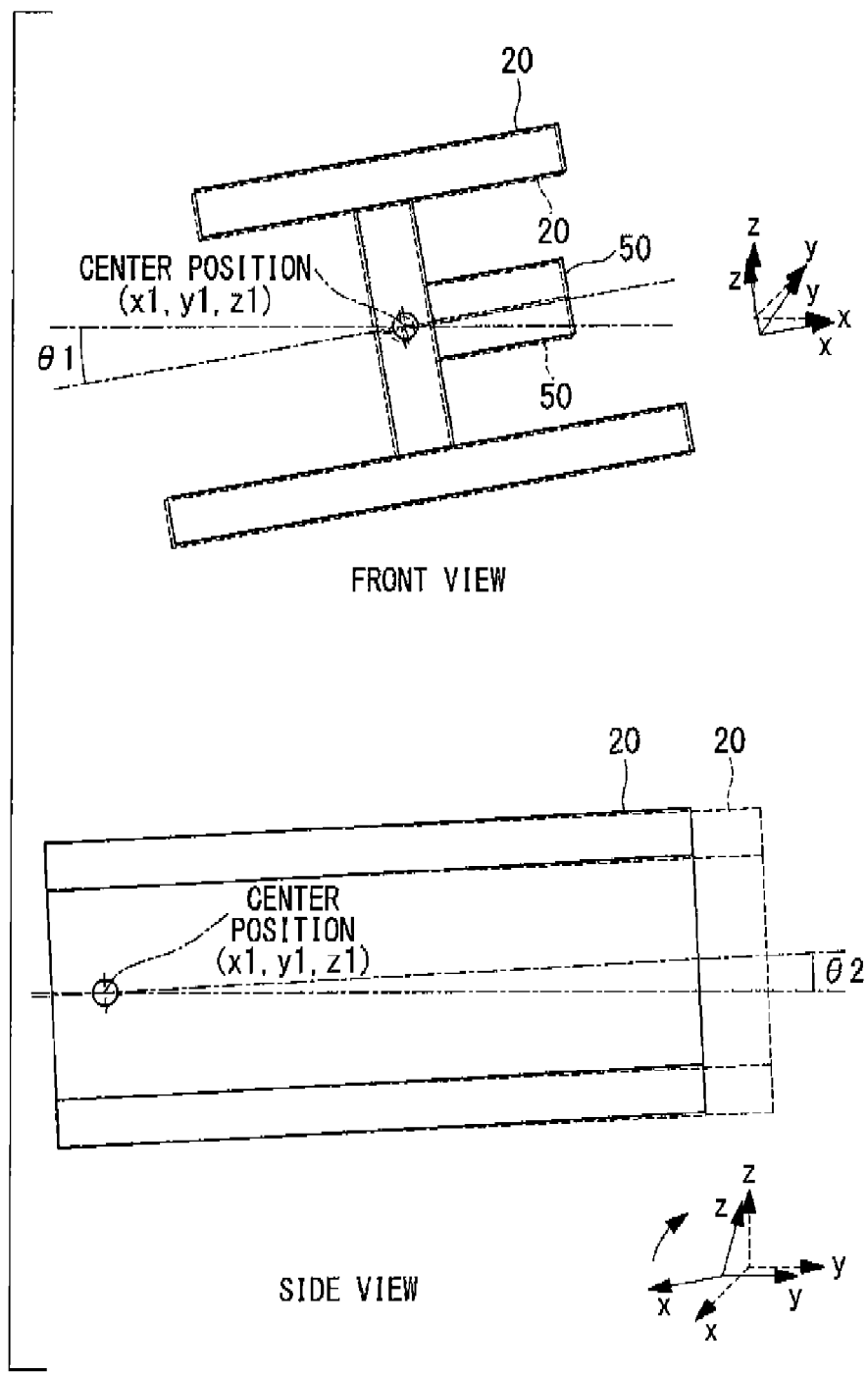
FIG. 20 is a diagram required for illustrating a correction method of NC data relating to the fourth embodiment of the present invention.

Then, as shown in FIG. 20, rotational correction is performed by rotating NC data for each of the top face and the side face by an amount of calculated inclination $\theta 1$, $\theta 2$ with the coordinate of center position (x1, y1, z1) being as a reference (rotational center). This will prevent the measurement ranges of both side faces and the bottom face from coming off the target area of correction, and allow more accurate capturing of minute errors (for example, a thickness error and a twist error of the workpiece 20 itself, or the like). It is noted that in FIG. 20, an ideal position of the workpiece 20 and an actual position of the workpiece 20 are shown as being displaced so that the above described errors become clear.

Moreover, since the above described measurement points are also programmed in the NC data, the coordinate of the above described measurement points are moved as well by performing rotational correction to adjust the ideal position coordinates of the workpiece 20 to the actual position of the workpiece 20.

Next, measurement of the distance between the machining surface and the machining apparatus 1 is performed on other side faces and the bottom face in that order so that rotational correction for all the machining surfaces is performed.

Further, in the present fourth embodiment, second measurements are performed on each machining surface in order from the top face.

Now it is supposed that the first rotational correction has detected a deviation between the placement condition for a jig 21 of the workpiece 20 and the coordinate system, and performed rotational correction therefor. Even if this rotational correction is performed, there is a case that the deviation of an actual position of the workpiece 20 with respect to an ideal position of the workpiece 20 is within tolerance, but one size larger. That is, such workpiece 20 includes not only a net part but also an excess part.

For this reason, measurement of a portion to be left as a net part in the workpiece 20 (portion subjected to net-machining) is performed by the second measurement, and thereby positioning of the machining apparatus 1 with respect to the workpiece 20 will be performed with higher accuracy.

As so far described, the control device 30 relating to the present fourth embodiment measures a reference distance which is the distance between a machining surface of reference of the workpiece 20 and the machining apparatus 1, and corrects NC data of all the machining surfaces, further correcting NC data for each machining surface, based on the reference distance. Therefore, the control device 30 relating to the present fourth embodiment can correct machining data with higher accurately.

Although the present invention has been described by using the above described each embodiment so far, the technical scope of the present invention is not limited to the above described embodiments. Various alterations and improvements may be made to the above described each embodiment without departing from the scope of the present invention, and such alterations and improvements are to be included in the technical scope of the present invention.

For example, although in the above described each embodiment, the machining apparatus 1 has been described as a form of a machining apparatus for machining a workpiece 20 by ejecting ultrahigh pressure water thereto, the present invention is not limited to this, and the machining apparatus 1 may be a form of another machining apparatus which includes a multi-joint arm provided with a machining tool.

Moreover, although in the above described each embodiment, a form of NC data which is divided by the machining surfaces has been described, the present invention is not limited to this, and the NC data may be a form which is not divided by the machining surfaces.

Moreover, the flow of the correction processing described in the above described each embodiment is merely an example, and therefore unnecessary steps may be removed, new steps may be added, and processing order may be changed within a range not departing from the scope of the present invention.

REFERENCE SIGNS LIST

1 Machining apparatus
9 Arm
10 Arm
11 Arm
12 Arm
14 Abrasive nozzle assembly (Machining tool)
20 Workpiece (Machining object)
30 Control device
31 Distance measurement sensor (Distance measurement means)
32 Storage section (Storage means)
34 Correction section (Correction means)

The invention claimed is:

1. A control device for a machining apparatus including a multi-joint arm provided with a machining tool for machining a machining object, the control device comprising:
a storage section that stores machining data indicating an ideal position of a machining region of the machining object by the machining apparatus;
a distance measurement sensor placed on the arm and that measures a distance between the machining object and the machining apparatus for each machining surface of the machining object; and
a correction section that corrects the machining data for each of the machining surfaces based on a measurement result by the distance measurement sensor, wherein
the machining data is divided by the machining surfaces, and is stored in the storage section,
the distance measurement sensor measures the distance between at least two measurement points of the machining surface and the machining apparatus on a predetermined control axis,
the correction section determines positions of the measurement points based on the measurement result by the distance measurement sensor to calculate a first straight line connecting the measurement points, uses the machining data stored in the storage section to calculate a second straight line connecting positions corresponding to the measurement points, sets an intersection point of the first straight line and the second straight line as a position of a rotational center, calculates an inclination of the first straight line with respect to the second straight line from an angle formed by the first straight line and the second straight line, and performs coordinate transformation with respect to the machining data based on the position of the rotational center and the inclination, so that the machining data is adjusted to an actual position and posture of the machining object, and a control section controls the machining apparatus to machine the object based on the adjusted machining data.

2. The control device for a machining apparatus according to claim 1, wherein upon measurement of the distance between a predetermined one of the machining surfaces and the machining apparatus with the distance measurement sensor, a measurement position of the predetermined one of the machining surfaces is modified based on deviation occurred on another of the machining surfaces.

3. The control device for a machining apparatus according to claim 1, wherein the correction section moves a center position of the machining object indicated by the machining data to a center position of the actual machining object, and performs correction by rotating the machining data after the center position is moved, based on a measurement result by the distance measurement sensor.

4. The control device for a machining apparatus according to claim 1, wherein the distance measurement sensor measures a reference distance which is a distance between the machining surface of reference and the machining apparatus, and
the correction section corrects the machining data for all the machining surfaces based on the reference distance, and then corrects the machining data for each of the machining surfaces based on a measurement result by the distance measurement sensor.

5. The control device for a machining apparatus according to claim 1, wherein the distance measurement sensor measures a distance to a prespecified reference position for a plurality of different postures of the arm and is thereby calibrated such that no error occurs in measurement of the distance in different postures of the arm.

6. A machining apparatus, comprising:
an arm provided with a machining tool for machining a machining object at multiple joints, and
the control device according to claim 1.

7. A correction method of machining data indicating a machining region of a machining object by use of a machining apparatus including a multi-joint arm provided with a machining tool, the method comprising:
a first step of measuring a distance between the machining object and the machining apparatus for each machining surface of the machining object with a distance measurement sensor placed on the arm; and
a second step of correcting the machining data for each of the machining surfaces based on a measurement result by the distance measurement sensor, wherein
the machining data is divided by the machining surfaces, and is stored in a storage section,
the first step measures the distance between at least two measurement points of the machining surface and the machining apparatus at least two locations on a predetermined control axis,
the second step determines positions of the measurement points based on the measurement result by the distance measurement sensor to calculate a first straight line connecting the measurement points, uses the machining data stored in the storage section to calculate a second straight line connecting positions corresponding to the measurement
points, sets an intersection point of the first straight line and the second straight line as a position of a rotational center, calculates an inclination of the first straight line with respect to the second straight line from an angle formed by the first straight line and the second straight line, and performs coordinate transformation with respect to the machining data based on the position of the rotational center and the inclination so that the machining data is adjusted to an actual position and posture of the machining object, and the method also includes controlling the machining apparatus to machine the object based on the adjusted machining data.

* * * * *